United States Patent
Choi et al.

(10) Patent No.: US 10,044,483 B2
(45) Date of Patent: Aug. 7, 2018

(54) APPARATUS AND METHOD FOR TRANSMITTING AND RECEIVING MESSAGE

(71) Applicant: Samsung Electronics Co., Ltd., Gyeonggi-do (KR)

(72) Inventors: Woo-Young Choi, Gyeonggi-do (KR); Mahesh Shivananda, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 98 days.

(21) Appl. No.: 14/957,864

(22) Filed: Dec. 3, 2015

(65) Prior Publication Data

US 2016/0165600 A1 Jun. 9, 2016

(30) Foreign Application Priority Data

Dec. 4, 2014 (KR) ........................ 10-2014-0172793

(51) Int. Cl.
*H04L 5/00* (2006.01)
*H04L 1/16* (2006.01)
*H04L 12/58* (2006.01)

(52) U.S. Cl.
CPC .......... *H04L 5/0055* (2013.01); *H04L 1/1671* (2013.01); *H04L 51/34* (2013.01); *H04L 51/04* (2013.01)

(58) Field of Classification Search
CPC ............................................... H04W 72/0446
See application file for complete search history.

(56) References Cited

U.S. PATENT DOCUMENTS

| | | | | |
|---|---|---|---|---|
| 7,069,301 B2* | 6/2006 | Jerbi | ................... | H04L 12/5835 709/206 |
| 7,085,812 B1* | 8/2006 | Sherwood | ........... | H04L 12/5875 709/206 |
| 7,836,132 B2* | 11/2010 | Qureshi | .............. | H04L 12/5875 709/206 |
| 8,116,739 B2* | 2/2012 | Klassen | ............... | G06Q 10/107 345/156 |
| 8,793,625 B2* | 7/2014 | Rhee | ................. | H04M 1/72522 715/783 |
| 8,848,085 B2* | 9/2014 | O | ..................... | H04M 1/274525 348/207.1 |
| 8,954,512 B2* | 2/2015 | Friend | ............... | G06F 17/30575 709/206 |
| 8,965,421 B1* | 2/2015 | Sanjeev | .................. | H04W 4/14 455/414.1 |
| 9,154,606 B2* | 10/2015 | Tseng | ................. | H04M 1/72552 |
| 9,178,843 B2* | 11/2015 | Peng | ....................... | H04L 51/30 |
| 9,230,356 B2* | 1/2016 | Chan | ....................... | G06T 13/00 |
| 9,590,929 B2* | 3/2017 | Banatwala | ............. | H04L 51/04 |

(Continued)

*Primary Examiner* — Parth Patel
(74) *Attorney, Agent, or Firm* — Cha & Reiter, LLC

(57) ABSTRACT

Disclosed herein is a method and an electronic device. The electronic device may include a display and a transmission/reception module, and at least one processor. The processor may implemented the method, including receiving a first message and a second message to be transmitted to an external electronic device, generating, by at least one processor, a combined message including both the first message and the second message, and transmitting, by a transmission/reception module, the combined message to the external electronic device.

14 Claims, 24 Drawing Sheets

(56) References Cited

U.S. PATENT DOCUMENTS

| | | | | |
|---|---|---|---|---|
| 9,614,800 | B1* | 4/2017 | Pulczinski | H04L 51/16 |
| 9,626,655 | B2* | 4/2017 | Haff | G06Q 10/107 |
| 9,646,353 | B2* | 5/2017 | Nielsen | G06Q 50/08 |
| 9,667,769 | B2* | 5/2017 | Clarke | H04M 1/72547 |
| 9,680,803 | B2* | 6/2017 | Moshir | H04L 63/0464 |
| 2002/0018638 | A1* | 2/2002 | Sparks | H04N 5/4401 |
| | | | | 386/355 |
| 2005/0278425 | A1* | 12/2005 | Wilsher | H04L 12/5835 |
| | | | | 709/204 |
| 2007/0058789 | A1* | 3/2007 | Lim | H04W 76/025 |
| | | | | 379/88.17 |
| 2007/0143417 | A1* | 6/2007 | Daigle | G06Q 10/107 |
| | | | | 709/206 |
| 2008/0076455 | A1* | 3/2008 | Kim | H04M 1/72552 |
| | | | | 455/466 |
| 2008/0082409 | A1* | 4/2008 | Huynh | G06Q 10/107 |
| | | | | 705/14.69 |
| 2008/0219416 | A1* | 9/2008 | Roujinsky | G06Q 30/02 |
| | | | | 379/88.13 |
| 2008/0294735 | A1* | 11/2008 | Muntermann | H04L 51/14 |
| | | | | 709/206 |
| 2009/0089716 | A1* | 4/2009 | Chen | G06F 3/011 |
| | | | | 715/863 |
| 2009/0125595 | A1* | 5/2009 | Maes | H04L 12/585 |
| | | | | 709/206 |
| 2010/0093379 | A1* | 4/2010 | Neely | H04L 51/36 |
| | | | | 455/466 |
| 2010/0153505 | A1* | 6/2010 | Oh | G06Q 10/107 |
| | | | | 709/206 |
| 2010/0169917 | A1* | 7/2010 | Harboe | H04N 7/15 |
| | | | | 725/34 |
| 2010/0205031 | A1* | 8/2010 | Nielsen | G06Q 10/063 |
| | | | | 705/7.11 |
| 2010/0304766 | A1* | 12/2010 | Goyal | H04L 51/34 |
| | | | | 455/466 |
| 2010/0312831 | A1* | 12/2010 | Xie | G06Q 10/109 |
| | | | | 709/204 |
| 2011/0142211 | A1* | 6/2011 | Maes | H04L 51/14 |
| | | | | 379/88.13 |
| 2011/0258266 | A1* | 10/2011 | Serra | H04M 3/5116 |
| | | | | 709/206 |
| 2012/0078447 | A1* | 3/2012 | McGuffin | G08G 5/0013 |
| | | | | 701/3 |
| 2012/0179767 | A1* | 7/2012 | Clarke | H04L 51/34 |
| | | | | 709/206 |
| 2012/0191799 | A1 | 7/2012 | Pattan et al. | |
| 2012/0231770 | A1* | 9/2012 | Clarke | H04L 12/5885 |
| | | | | 455/414.1 |
| 2013/0117400 | A1* | 5/2013 | An | H04L 63/0823 |
| | | | | 709/206 |
| 2013/0212202 | A1* | 8/2013 | Lee | G06Q 10/107 |
| | | | | 709/206 |
| 2013/0305164 | A1* | 11/2013 | Karunamuni | G06Q 10/107 |
| | | | | 715/752 |
| 2014/0025751 | A1 | 1/2014 | Dietz | |
| 2014/0096033 | A1* | 4/2014 | Blair | G06F 3/01 |
| | | | | 715/752 |
| 2014/0122154 | A1* | 5/2014 | Kellogg | G06Q 10/1095 |
| | | | | 705/7.19 |
| 2014/0201293 | A1* | 7/2014 | Turakhia | H04L 51/04 |
| | | | | 709/206 |
| 2014/0222933 | A1* | 8/2014 | Stovicek | H04M 1/72547 |
| | | | | 709/206 |
| 2014/0351713 | A1* | 11/2014 | Hallerstrom Sjostedt | G06F 3/0484 |
| | | | | 715/752 |
| 2015/0026269 | A1* | 1/2015 | Canton | H04L 51/04 |
| | | | | 709/206 |
| 2015/0100628 | A1* | 4/2015 | LaPine | H04M 3/53366 |
| | | | | 709/203 |
| 2015/0235540 | A1* | 8/2015 | Verna | H04W 4/12 |
| | | | | 340/539.11 |
| 2015/0244972 | A1* | 8/2015 | Pulido | H04N 5/91 |
| | | | | 386/295 |
| 2015/0271120 | A1* | 9/2015 | Langholz | H04L 51/16 |
| | | | | 709/206 |
| 2015/0281156 | A1* | 10/2015 | Beausoleil | H04L 51/14 |
| | | | | 709/206 |
| 2015/0296353 | A1* | 10/2015 | Meyer | H04W 4/14 |
| | | | | 455/414.4 |
| 2015/0371173 | A1* | 12/2015 | Jalali | G06Q 10/063112 |
| | | | | 705/7.14 |
| 2016/0050642 | A1* | 2/2016 | Brown | H04W 68/005 |
| | | | | 455/418 |
| 2016/0065658 | A1* | 3/2016 | Alon | G06Q 10/063116 |
| | | | | 709/204 |
| 2016/0135020 | A1* | 5/2016 | Moshir | H04L 63/0428 |
| | | | | 455/466 |
| 2016/0165600 | A1* | 6/2016 | Choi | H04L 51/34 |
| | | | | 370/336 |
| 2016/0373571 | A1* | 12/2016 | Woolsey | G06F 17/289 |

* cited by examiner

```
(left side):                                                  710
<?xml version="1.0" encoding="UTF-8">
<imdn xmlns="urn:ietf:params:xml:ns:imdn">
        <message-id>c9dea8</message-id>
        <datetime>2013-07-22T09:39:26.074Z</datetime>
        <recipient-uri>tel:+34695006198</recipient-uri>
        <original-recipient-uri>sip:anonymous@anonymous.invalid</original-recipient-uri>
        <delivery-notification>
                <status>delivered</status>
        </delivery-notification>
</imdn>
```

FIG.7A

```
(right side):                                                 720
<?xml version="1.0" encoding="UTF-8">
<imdn xmlns="urn:ietf:params:xml:ns:imdn">
        <message-id>c9dea8</message-id>
        <datetime>2013-07-22T09:39:26.074Z</datetime>
        <recipient-uri>tel:+34695006198</recipient-uri>
        <original-recipient-uri>sip:anonymous@anonymous.invalid</original-recipient-uri>
        <display-notification>
                <status>displayed</status>
        </display-notification>
</imdn>
```

FIG.7B

```
<?xml version="1.0" encoding="UTF-8">                              800
<imdn xmlns="urn:ietf:params:xml:ns:imdn">
        <message-id>c9dea8</message-id>
        <datetime>2013-07-22T09:39:26.074Z</datetime>
        <recipient-uri>tel:+34695006198</recipient-uri>
        <original-recipient-uri>sip:anonymous@anonymous.invalid</original-recipient-uri>
        <delivery-notification>
                <status>delivered</status>
        </delivery-notification>   ⌐ 810
        <display-notification>
                <status>displayed</status>
        </display-notification>   ⌐ 820
</imdn>
```

FIG.8

```
From: <sip: anonymous@anonlymous.invalid>              1100
To: <sip: anonymous@anonymous.invalid>
DateTime: 2013-11-29T14:45:55-00:00
NS: imdn <urn::ietf:params:imdn>
imdn.Message-ID: abc12345 ⎯⎯ 1110
Content-Disposition: notification Content-type: message/imdn+xml
Content-Length: 287

<?xml version="1.0" encoding="UTF-8">
<imdn xmlns="urn:ietf:params:xml:ns:imdn">      ⎯1120
        <message-id>abc12345</message-id>
        <datetime>2013-07-22T09:39:26.074Z</datetime>
        <recipient-uri>tel:+34695006198</recipient-uri>
        <original-recipient-uri>sip:anonymous@anonymous.invalid</original-recipient-uri>
        <display-notification>
                <status>displayed</status>
        </display-notification>          ⎯ 1130
</imdn>
```

FIG.11

```
From: <sip: anonymous@anonlymous.invalid>
To: <sip: anonymous@anonymous.invalid>                      1200
DateTime: 2013-11-29T14:45:55-00:00
NS: imdn <urn::ietf:params:imdn>
imdn.Message-ID: abc12345,xyz7890
Content-Disposition: notification
                                        1212

Content-type: message/imdn+xml    1211
Content-Length: 287

<?xml version="1.0" encoding="UTF-8">
<imdn xmlns="urn:ietf:params:xml:ns:imdn">        1220
        <message-id>abc12345,xyz7890</message-id>
        <datetime>2013-07-22T09:39:26.074Z</datetime>
        <recipient-uri>tel:+34695006198</recipient-uri>
        <original-recipient-uri>sip:anonymous@anonymous.invalid</original-recipient-uri>
        <display-notification>
                <status>displayed</status>
        </display-notification>        1230
</imdn>
```

FIG.12

```
MSRP A2DreBBsQwY6YHkidcDj SEND                          1500
To-Path: msrp://217.130.4.146:26309/2000875-9639-2000876;tcp
From-Path: msrp://10.30.126.238:9991/69aZbL;tcp
Message-ID: PfVSW89P2
Success-Report: no
Failure-Report: yes
Byte-Range: 1-332/332
Content-Type: message/cpim  ─── 1510

From: <sip: anonymous@anonymous.invalid>
To: <sip:anonymous@anonymous.invalid>
Datetime: 2013-11-29T14:45:50+09:00
NS: imdn <urn:ietf:params:imdn>
imdn.Message-ID: MessageID1
imdn.Disposition-Notification: positive-delivery, display Content-type: text/plain;charset=UTF-8
Content-Length: 5
Hello
```

FIG.15

```
MSRP A2DreBBsQwY6YHkidcDj SEND                                    1600
To-Path: msrp://217.130.4.146:26309/2000875-9639-2000876;tcp
From-Path: msrp://10.30.126.238:9991/69aZbL;tcp
Message-ID: PfVSW89P2
Success-Report: no
Failure-Report: yes
Byte-Range: 1-673/673
Content-Type: multipart/mixed; boundary=cpimboundary   ───1610

--cpimboundary   ───1620
Content-Type: message/cpim

From: <sip: anonymous@anonymous.invalid>
To: <sip:anonymous@anonymous.invalid>
Datetime: 2013-11-29T14:45:50+09:00              ├─1630
NS: imdn <urn:ietf:params:imdn>
imdn.Message-ID: MessageID1
imdn.Disposition-Notification: positive-delivery, display Content-type: text/plain;charset=UTF-8
Content-Length: 5

Hello
--cpimboundary   ───1635
Content-Type: message/cpim

From: <sip: anonymous@anonymous.invalid>
To: <sip:anonymous@anonymous.invalid>
Datetime: 2013-11-29T14:45:50+09:00              ├─1640
NS: imdn <urn:ietf:params:imdn>
imdn.Message-ID: MessageID2
imdn.Disposition-Notification: positive-delivery, display Content-type: text/plain;charset=UTF-8
Content-Length: 6

Hello1
```

FIG.16

APPARATUS AND METHOD FOR TRANSMITTING AND RECEIVING MESSAGE

CLAIM OF PRIORITY

This application claims priority under 35 U.S.C. § 119(a) from Korean Application Serial No. 10-2014-0172793, which was filed in the Korean Intellectual Property Office on Dec. 4, 2014, the entire content of which is hereby incorporated by reference.

BACKGROUND

Field of the Disclosure

The present disclosure relates to an apparatus and a method for transmitting and receiving a message.

Description of the Related Art

Recently, after the introduction of mobile electronic devices, there has been a rapid upward trend in the volume of messaging traffic transmitted/received between mobile electronic devices. Particularly, the mobile electronic device may execute chatting programs and transmit/receive chatting messages to/from another electronic device. The mobile electronic device may form communication connections with one another electronic device through, for example, an "IMS" or an "Instant Messaging Services" core. The mobile electronic device may form a data session based on a Session Initiation Protocol ("SIP") and transmit/receive a message through the formed data session. An IM or "Instant Messaging" server may transmit/relay a message received from the mobile electronic device to another electronic device.

SUMMARY

As messages transmitted from a transmitting side electronic device rapidly increase, traffic to be processed by the transmitting side electronic devices or relay servers also rapidly increases and, accordingly, the introduction of a message transmission/reception method and a message transmission/reception apparatus for transmitting/receiving a message, which can alleviate network traffic demands, is desirable.

Various embodiments of the present disclosure may provide a message transmission/reception method and a message transmission/reception apparatus for transmitting a combined message to solve the above described problems or other problems.

In an aspect of the present disclosure, a method in an electronic device includes receiving a first message and a second message to be transmitted to an external electronic device, generating, by at least one processor, a combined message including both the first message and the second message, and transmitting, by a transmission/reception module, the combined message to the external electronic device.

In an aspect of the present disclosure, an electronic device includes: a display, a transmission/reception module configured to communicate with an external electronic device, and at least one processor, configured to: receive a first message and a second message to be transmitted to the external electronic device, generate a combined message including both the first message and the second message, and control the transmission/reception module to transmit the combined message to the external electronic device.

In an aspect of the present disclosure, a method in an electronic device includes: receiving a first message and a second message to be transmitted to a first external electronic device from a second electronic device, when a message combination event for combining the first message and the second message is acquired, generating a combined message including both the first message and the second message, and transmitting the combined message to the first external electronic device.

In an aspect of the present disclosure, a server includes a transmission/reception module, and at least one processor, configured to: receive a first message and a second message to be transmitted to a first external electronic device from a second external electronic device, and when a message combination event for combining the first message and the second message is acquired, generate a combined message including both the first message and the second message, and transmit the combined message to the first external electronic device.

In an aspect of the present disclosure, a method in an electronic device includes: receiving a combined message, the combined message including both a first message and a second message to be transmitted to an external electronic device, retrieving the first message and the second message from the combined message by parsing the combined message, and processing the retrieved first message and the second message.

In an aspect of the present disclosure, an electronic device is disclosed, including: a transmission/reception module, and at least one processor, configured to: receive a combined message including both a first message and a second message to be transmitted to an external electronic device, and retrieve the first message and the second message by parsing the combined message and processing the first message and the second According to various embodiments of the present disclosure, a message transmission/reception method and a message transmission/reception apparatus for transmitting a combined message can be provided. The message transmission/reception method and the message transmission/reception apparatus for transmitting the combined message can transmit a combined message which is aggregated from a plurality of messages in a single message format. Accordingly, compared to the situation where a plurality of messages are transmitted individually, respectively, transmission of the combined messages can alleviate network traffic usage and demand in terms of processing required by electronic devices and a servers.

BRIEF DESCRIPTION OF THE DRAWINGS

The above and other aspects and features of the present disclosure will be more apparent from the following detailed description taken in conjunction with the accompanying drawings, in which:

FIG. 7A and FIG. 7B illustrate message formats according to an example useful for better illustrating the present disclosure;

FIG. 8 illustrates a format of a combined message according to various embodiments of the present disclosure;

FIG. 11 illustrates a format of a display acknowledge message according to an example useful for better illustrating the present disclosure;

FIG. 12 illustrates a format of a display acknowledge message according to various embodiments of the present disclosure;

FIG. 15 illustrates a format of a chatting message according to an example useful for better illustrating the present disclosure;

FIG. 16 illustrates a format of a combined message according to various embodiments of the present disclosure;

DETAILED DESCRIPTION

Figure 1:
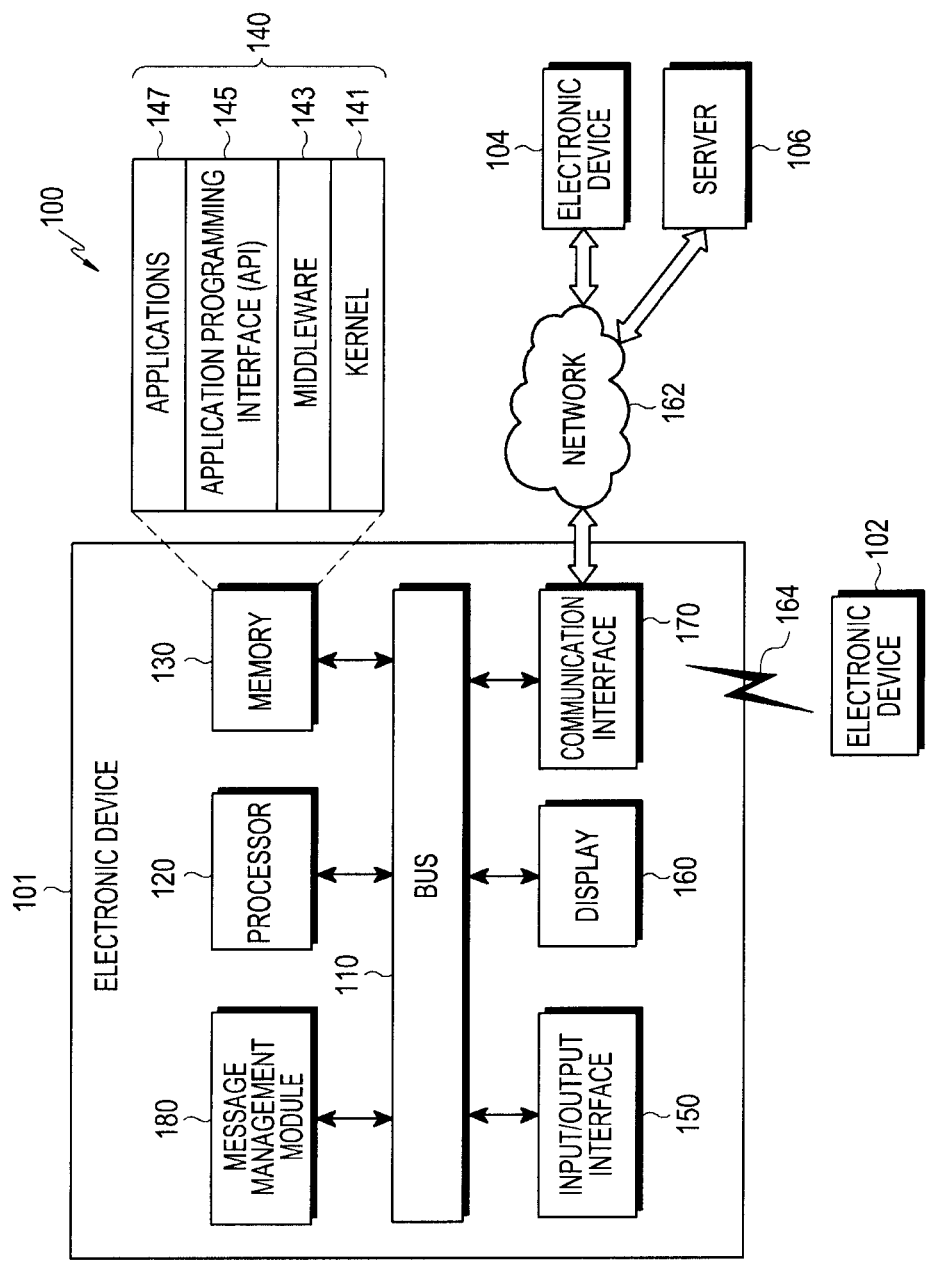
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. In the present disclosure, the term "user" may indicate a person using an electronic device or a device (e.g. an artificial intelligence electronic device) using an electronic device.

Referring to FIG. 1, an electronic device 101 within in a network environment 100 is disclosed in various embodiments. The electronic device 101 may include a bus 110, a processor 120, a memory 130, an input/output interface 150, a display 160, a communication interface 170, and a message management module 180. In some embodiments, the electronic device 101 may omit at least one of the above components or further include other components.

The bus 110 may include a circuit for connecting the components 120 to 180 and transmitting communication between the components (for example, control messages and/or data).

The processor 120 may include one or more of a Central Processing Unit (CPU), an Application Processor (AP), and a Communication Processor (CP). The processor 120 may control, for example, one or more other components of the electronic device 101 and/or process an operation or data related to communication. The processor 120 may be called a controller or may include a controller as a part thereof.

The memory 130 may include a volatile memory and/or a non-volatile memory. The memory 130 may store, for example, commands or data related to at least one other component of the electronic device 101. According to an embodiment, the memory 130 may store software and/or a program 140. The program 140 may include, for example, a kernel 141, middleware 143, an Application Programming Interface (API) 145, and/or an application program (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented in other programs (for example, the middleware 143, the API 145, or the application 147). Furthermore, the kernel 141 may provide an interface through which the middleware 143, the API 145, or the application program 147 may access individual components of the electronic device 101 to control or manage system resources.

For example, the middleware 143 may serve as a relay for allowing the API 145 or the application programs 147 to communicate with the kernel 141 to exchange data. Furthermore, in regard to task requests received from the application program 147, the middleware 143 may perform a control (for example, scheduling or load balancing) for the task requests using, for example, a method of assigning at least one application a priority for using the system resources (for example, the bus 110, the processor 120, or the memory 130) of the electronic device 101.

The API 145 is an interface by which the applications 147 control functions provided from the kernel 141 or the middleware 143, and may include, for example, at least one interface or function (for example, instructions) for file control, window control, image processing, or text control.

In the specification, the applications may be referred to as the application program.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) to users. The display 160 may include a touch screen and receive, for example, a touch input, a gesture input, a proximity input, or a hovering input using an electronic pen or a user's body part.

The communication interface 170 may configure communication between, for example, the electronic device and an external device (for example, a first external electronic device 102, a second external electronic device 104, or a server 106). For example, the communication interface 170 may be connected to a network 162 through wireless or wired communication to communicate with the external device (for example, the external electronic device 104 or the server 106), or may have wired or wireless direct connection 164 to electronic device 102.

The wireless communication may use, for example, at least one of LTE, LTE-A, CDMA, WCDMA, UMTS, WiBro, and GSM, for example, as a cellular communication protocol. The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a LAN or a WAN), the Internet, and a telephone network.

Each of the first and second external electronic devices 102 and 104 may be a device which is the same as or different from the electronic device 101. According to an embodiment, the server 106 may include a group of one or more servers. According to various embodiments, all or some of the operations performed by the electronic device 101 may be performed by another electronic device or a plurality of electronic devices (for example, the electronic device 102 or 104 or the server 106). According to an embodiment, when the electronic device 101 should perform some functions or services automatically or by a request, the electronic device 101 may make a request for performing at least some of the functions related to the functions or services to another device (for example, the electronic devices 102 and 104 or the server 106) instead of performing the functions or services by itself. Another electronic device (for example, the electronic device 102 or 104 or the server 106) may execute the requested functions or additional functions, and transmit a result thereof to the electronic device 101. The electronic device 101 may provide the requested functions or services based on the received result as it is or after additionally processing the received result. To achieve this, for example, cloud computing, distributed computing, or client-server computing technology may be used.

According to an embodiment, the message management module 180 may support driving of the electronic device 101 by performing at least one of the operations (or functions) implemented by the electronic device 101. For example, the server 106 may include a message management module (not illustrated) which may support the message management module 180 implemented in the electronic device 101. For example, the message management module 180 may include one or more components of the message management module 180 to perform (on behalf of the message management module 180) at least one of operations of the message management module 180.

The message management module 180 may process at least some of the information obtained from other components (for example, at least one of the processor 120, the memory 130, the input/output interface 150, and the communication interface 170) and utilize the same in various manners. For example, the message management module 180 may control at least some functions of the electronic device 101 by using the processor 120 or independently thereof so that the electronic device 101 may interwork with other electronic devices (for example, the electronic device 104 or the server 106). The message management module 180 may be integrated into the processor 120 or the communication interface 170. According to an embodiment, at least one component of the message management module 180 may be included in the server 106 and receive supporting of at least one operation implemented in the message management module 180 from the server 106.

Figure 2:
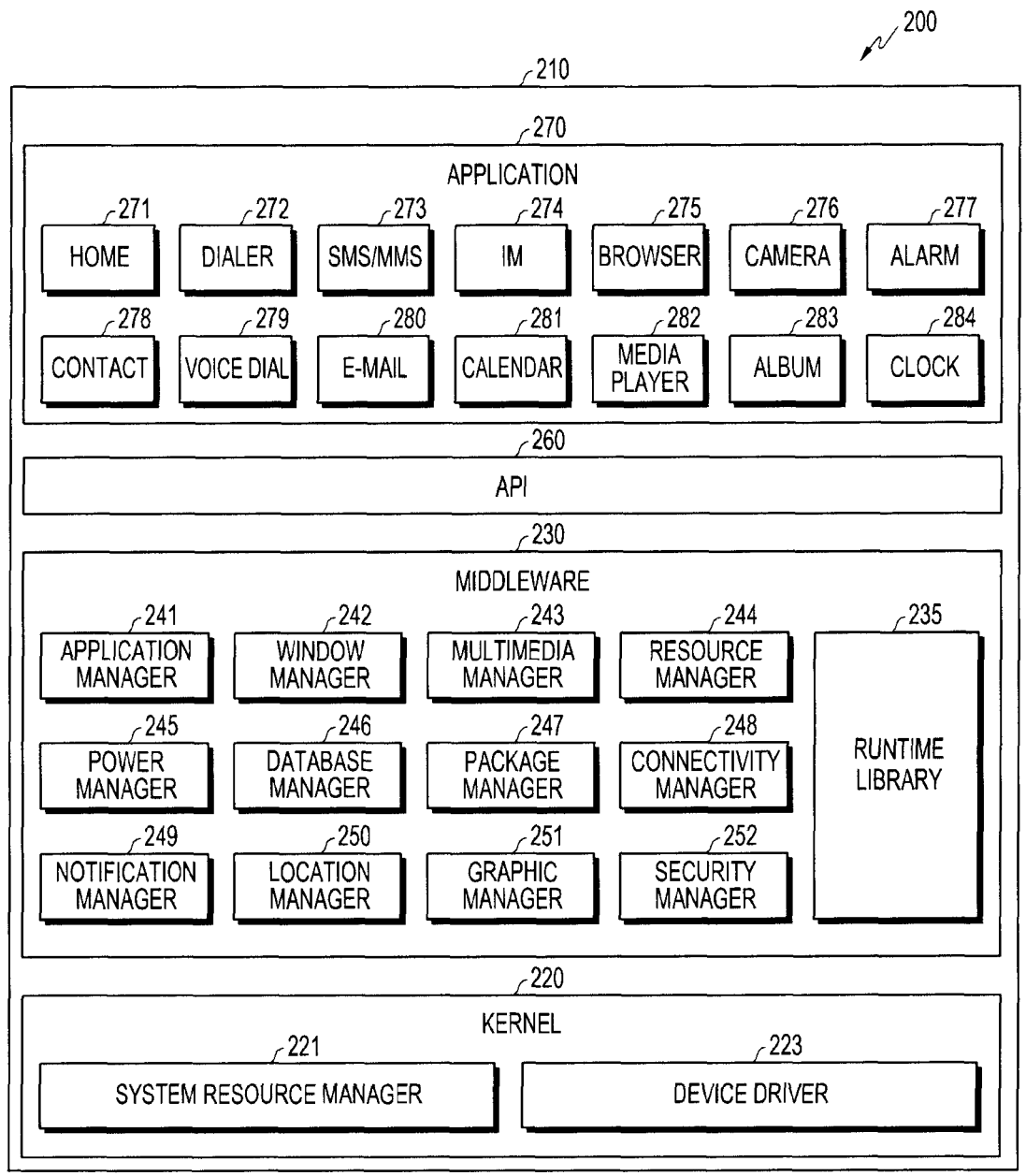
FIG. 2 is a block diagram of a program module according to various embodiments of the present disclosure.

FIG. 2 is a block diagram 200 of a program module 210 according to various embodiments of the present disclosure. According to an embodiment, the program module 210 (for example, the program 140) may include an Operating System (OS) for controlling resources related to the electronic device (for example, the electronic device 101) and/or various applications (for example, the application program 147) executed in the operating system. The operating system may be, for example, Android, iOS, Windows, Symbian, Tizen, Bada, or the like.

The programming module 210 may include a kernel 220, middleware 230, an Application Programming Interface (API) 260, and/or an application 270. At least some of the program module 210 may be preloaded in the electronic device or downloaded in the server (for example, the server 106).

The kernel 220 (for example, the kernel 141 of FIG. 1) may include, for example, a system resource manager 221 or a device driver 223. The system resource manager 221 may control, allocate, or collect the system resources. According to an embodiment, the system resource manager 221 may include a process manager, a memory manager, or a file system manager. The device driver 223 may include, for example, a display driver, a camera driver, a Bluetooth driver, a shared-memory driver, a USB driver, a keypad driver, a WI-FI driver, an audio driver, or an Inter-Process Communication (IPC) driver.

The middleware 230 may provide a function utilized by the applications 270 in common or provide various functions to the applications 270 through the API 260 so that the applications 270 may efficiently use limited system resources of the electronic device. According to an embodiment of the present disclosure, the middleware 230 (for example, the middleware 143) may include at least one of a run time library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The run time library 235 may include, for example, a library module that a compiler uses in order to add new functions through a programming language while the application 270 is executed. The run time library 235 may perform input/output management, memory management, or a function for an arithmetic function.

The application manager 241 may manage, for example, a life cycle of at least one application among the applications 270. The window manager 242 may manage a GUI resource used in a screen. The multimedia manager 243 may detect a format utilized for reproducing various media files and encode or decode a media file using a codec appropriate for the corresponding format. The resource manager 244 may manage resources such as a source code, a memory or a storage space of at least one application among the applications 270.

The power manager 245 may operate together with, for example, a Basic Input/Output System (BIOS), so as to manage a battery or power and may provide power information utilized for the operation of the electronic device. The database manager 246 may generate, search for, or change a database to be used by at least one of the applications 270. The package manager 247 may manage the installation or updating of applications distributed in the form of a package file.

For example, the connectivity manager 248 may manage wireless connections, such as WI-FI or Bluetooth. The notification manager 249 may display or notify of an event such as a received message, an appointment, a proximity notification, and the like to a user without disturbance. The location manager 250 may manage location information of the electronic device. The graphic manager 251 may manage graphic effects to be provided to a user and user interfaces related to the graphic effects. The security manager 252 may provide various security functions utilized for system security or user authentication. According to an embodiment, when the electronic device (for example, electronic device 101) has a call function, the middleware 230 may further include a telephony manager for managing a voice call function or a video call function of the electronic device.

The middleware 230 may include a middleware module for forming a combination of various functions of the aforementioned components. The middleware 230 may provide a module specialized for each type of operating system in order to provide a differentiated function. In addition, a few existing components may be dynamically removed from the middleware 230, or new components may be added to the middleware 230.

The API 260 (for example, the API 145), which is a set of API programming functions, may be provided in a different configuration for each operating system. For example, in the case of Android or iOS, one API set may be provided for each platform. In the case of Tizen, two or more API sets may be provided for each platform.

The applications 270 (for example, the application program 147) may include, for example, one or more applications which can provide functions such as home 271, dialer 272, SMS/MMS 273, Instant Message (IM) 274, browser 275, camera 276, alarm 277, contacts 278, voice dialer 279, e-mail 280, calendar 281, media player 282, album 283, clock 284, health care (for example, measure exercise quantity or blood sugar), or environment information (for example, atmospheric pressure, humidity, or temperature information).

According to an embodiment, the applications 270 may include an application (hereinafter, referred to as an "information exchange application" for convenience of the description) supporting information exchange between the electronic device (for example, the electronic device 101) and external electronic devices (for example, the electronic devices 102 and 104). The information exchange application may include, for example, a notification relay application for transmitting predetermined information to the external electronic device, or a device management application for managing the external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user. The device management application may manage (for example, install, delete, or update), for example, a function for at least a part of the external electronic device (for example, the electronic device 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 270 may include an application (for example, health management application) designated according to attributes (for example, attributes of the electronic device such as the type of electronic device which corresponds to a mobile medical device) of the external electronic device (for example, the electronic device 102 or 104). According to an embodiment, the applications 270 may include an application received from the external electronic device (for example, the server 106, or the external electronic devices 102 or 104). According to an embodiment, the applications 270 may include a preloaded application or a third party application which can be downloaded from the server. Names of the elements of the program module 210, according to the above-described embodiments of the present disclosure, may change depending on the type of OS.

According to various embodiments of the present disclosure, at least some of the program module 210 may be implemented in software, firmware, hardware, or a combination of two or more thereof. At least some of the programming module 210 may be implemented (for example, executed) by, for example, the processor (for example, the AP 2210). At least some of the programming module 210 may include, for example, a module, program, routine, sets of instructions, process, or the like for performing one or more functions.

Figure 3:
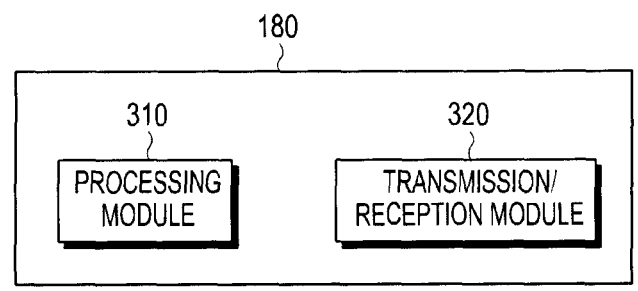
FIG. 3 is a block diagram of a screen configuration module of an electronic device according to various embodiments of the present disclosure.

FIG. 3 is a block diagram of a message management module 180 according to various embodiments of the present disclosure.

Referring to FIG. 3, the message management module 180 may include at least some or all of a processing module 310 and a transmission/reception module 320. The message management module 180 may be provided separately from the processor (for example, the processor 120) or may be entirely or partially integrated into the processor.

The processing module 310 according to various embodiments of the present disclosure may acquire a first message and a second message to be transmitted to a receiving side electronic device and generate a combined message combined from the first message and the second message. The transmission/reception module 320 may transmit the combined message to the receiving side electronic device. The transmission/reception module 320 is not software per se or pure software, and comprises hardware configured for the transmission and reception of messages, that may include a transmitter, receiver, transceiver. Other hardware such as one or more antennas may be used.

According to an embodiment, the first message may be a reception acknowledge message (e.g., an "acknowledgement" message) corresponding to a chatting message received from the receiving side electronic device, and the second message may be a display acknowledge message (e.g., an "acknowledgement" message) indicating that the received chatting message is displayed on the first electronic device.

According to an embodiment, the processing module 310 may generate the reception acknowledge message and hold transmission of the generated reception acknowledge message. When the received chatting message is displayed on the first electronic device, the processing module 310 may control the transmission/reception module 320 to transmit the combined message.

The processing module 310 may generate the combined message by describing a delivered status and a displayed status corresponding to the first message in a single message format based on formats of the first message and the second message.

According to an embodiment, the first message may be a first display acknowledge message corresponding to a first chatting message received from the receiving side electronic device, and the second message may be a second display acknowledge message corresponding to a second chatting message received from the receiving side electronic device.

When the first chatting message and the second chatting message are displayed on the first electronic device, the processing module 310 may control the transmission/reception module 320 to transmit the combined message.

The processing module 310 may generate the combined message by describing a first delivered status corresponding to the first message and a second delivered status corresponding to the second message in a single message format based on the format of the first message.

The processing module 310 may generate the combined message by describing an identifier of each of the first message and the second message in a single message format.

According to an embodiment, when the first message is generated, the processing module 310 may determine whether a preset message combination event is acquired. When the message combination event is acquired, the processing module 310 may control the transmission/reception module 320 to hold transmission of the first message and generate the second message to transmit the combined message.

Figure 4A:
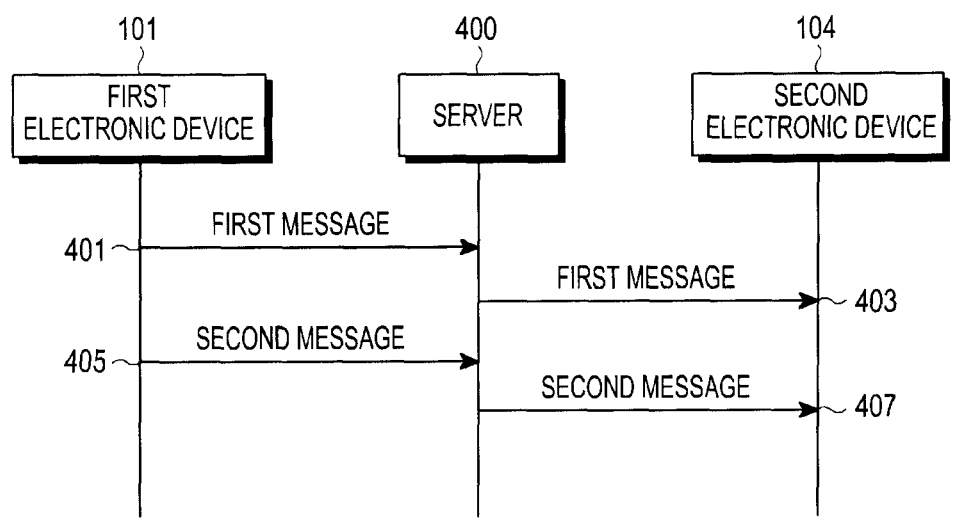
FIG. 4A is a flowchart illustrating a message transmission/reception method according to various embodiments of the present disclosure.

FIG. 4A is a flowchart illustrating a message transmission/reception method according to an example useful for better illustrating the present disclosure. As illustrated in FIG. 4A, the first electronic device 101 may transmit a generated first message to a server 400 in operation 401. The server 400 may transmit the received first message to the second electronic device 104 in operation 403. The first electronic device 101 may transmit a generated second message to the server 400 in operation 405. The server 400 may transmit the received second message to the second electronic device 104 in operation 407.

According to an embodiment, the first electronic device 101 may form a data session with the server 400. Further, the second electronic device 104 may form a data session with the server 400 and, accordingly, the first electronic device 101 and the second electronic device 104 may form the data sessions.

According to an embodiment, the first electronic device 101 and the second electronic device 104 may be included in an IP Multimedia Subsystem (IMS) and form the data session based on a Session Initiation Protocol (SIP). For example, the first electronic device 101 may transmit an SIP INVITE message to the server 400 (for example, an IM server of an IMS core). The server 400 may store, for example, a message history or determine whether to form an end-to-end Multiple Stream Reservation Protocol (MSRP) session while staying in an MSRP media path. When forming the end-to-end MSRP session, the server 400 may transmit the SIP INVITE message to the second electronic device 104. The second electronic device 104 may transmit a RINGING message to the server 400 in response to the received SIP INVITE message, and the server 400 may relay the received RINGING message to the first electronic device 101. Further, the second electronic device 104 may transmit an OK message to the server 400 in response to the received SIP INVITE message, and the server 400 may relay the received OK message to the first electronic device 101. The first electronic device 101 may transmit an ACK message to the server 400, and the server 400 may relay the ACK message to the second electronic device 104. In response to the reception of the ACK message, the first electronic device 101 and the server 400 may form a first MSRP session and the second electronic device 104 and the server 400 may form a second MSRP session.

After the MSRP session is formed, the first electronic device 101 may transmit an MSRP message to the server 400, and the server 400 may relay the received MSRP message to the second electronic device 104. The generated session may last before at least one of the first electronic device 101 and the second electronic device 104 deviates from the session or an inactivity timer is triggered and collapsed.

Meanwhile, for example, the first electronic device 101 may execute another program in the foreground while executing a program related to the session in the background. In this case, when the program related to the session is being executed in the background, the first electronic device 101 may maintain the session.

According to the above description, the first electronic device 101 may transmit/receive a first message or a second message to/from the second electronic device 104.

Figure 4B:
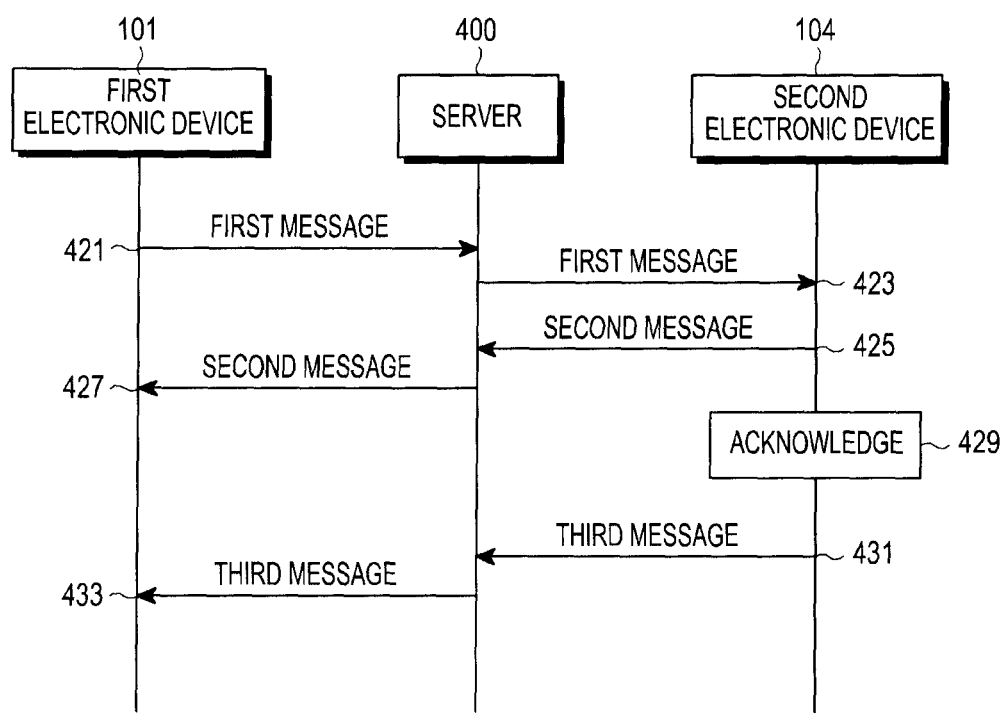
FIG. 4B is a flowchart illustrating an example message transmission/reception method useful for better illustrating the present disclosure.

FIG. 4B is a flowchart illustrating a message transmission/reception method according to an example useful for better illustrating the present disclosure.

The first electronic device 101 may transmit a first message to the server 400 in operation 421. The server 400 may receive the first message and transmit the received first message to the second electronic device 104 in operation 423. According to an embodiment, the first message may be a chatting message generated by the first electronic device 101. More specifically, the first electronic device 101 may execute a chatting program and generate the chatting message based on a user input. The first electronic device 101 may convert a format of data generated by the chatting program into a format suitable for data session transmission to generate the chatting message. The format suitable for the data session transmission may include at least one of, for example, a message identification, a message transmission time, a message transmission address, a message reception address, a message type, and data.

The second electronic device 104 may transmit a second message corresponding to the first message to the server 400 in operation 425. According to an embodiment, the second message may be a reception acknowledge message corresponding to the chatting message. The reception acknowledge message may be defined by a chatting program layer. According to another embodiment, the reception acknowledge message may be defined by a data session layer. The reception acknowledge message may be set as a message for the purpose of acknowledging reception of the chatting message by the receiving side electronic device.

According to an example, the second electronic device 104 may transmit the second message corresponding to the first message to the server 400 by triggering the reception of the first message.

The server 400 may relay the received second message to the first electronic device 101 in operation 427.

The second electronic device 104 may acknowledge the second message in step 429. More particularly, the second electronic device 104 may display another program, which is not the chatting program, in the foreground. Meanwhile, the second electronic device 104 may display the chatting program in the foreground again and display the received first message.

The second electronic device 104 may transmit a third message corresponding to a display acknowledge message indicating that the first message is displayed to the server 400 in operation 431. The display acknowledge message may be defined by a chatting program layer. According to another embodiment, the display acknowledge message may be defined by a data session layer. The server 400 may transmit the third message to the first electronic device 101 in operation 433.

The second electronic device 104 may perform the transmission two times to separately transmit the second message and the third message to the first electronic device 101.

Figure 5:
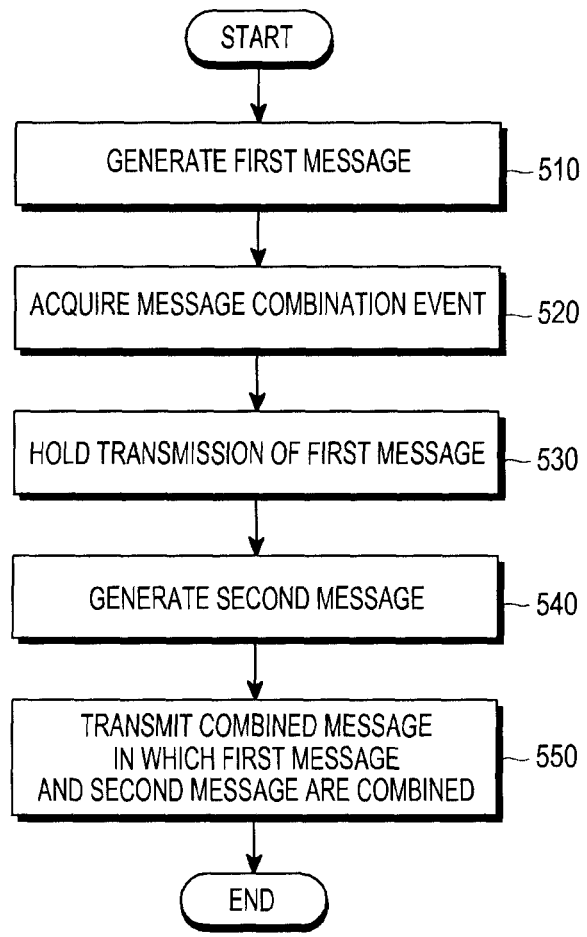
FIG. 5 is flowchart illustrating a message transmission/reception method of an electronic device according to various embodiments of the present disclosure.

FIG. 5 is flowchart illustrating a message transmission/reception method of an electronic device according to various embodiments of the present disclosure.

The electronic device may generate a first message in operation 510. For example, the first message may correspond to first data output from a first program executed in the electronic device. The electronic device may generate the first message by using the first data output from the first program.

The electronic device may acquire a message combination event in operation 520. According to an embodiment, the message combination event may be a reception acknowledge message corresponding to a chatting message indicating the reception of the generated first message.

When the message combination event is acquired, the electronic device may hold transmission of the first message in operation 530. The electronic device may hold the transmission of the first message until a message to be combined with the first message is generated and the combined message is transmitted.

The electronic device may generate a second message to be combined with the first message in operation 540. For example, the second message may be generated in accordance with the displaying of the received chatting message in the foreground of the electronic device.

The electronic device may generate the combined message in which the first message and the second message are combined and transmit the combined message to a receiving side electronic device in operation 550. The combined message may be generated based on a format of at least one of the first message and the second message. For example, the electronic device may generate the combined message based on the format of the first message. The electronic device may generate the combined message including first data on the first message and second data on the second message based on at least one of the format of the first message and the format of the second message.

Figure 6:
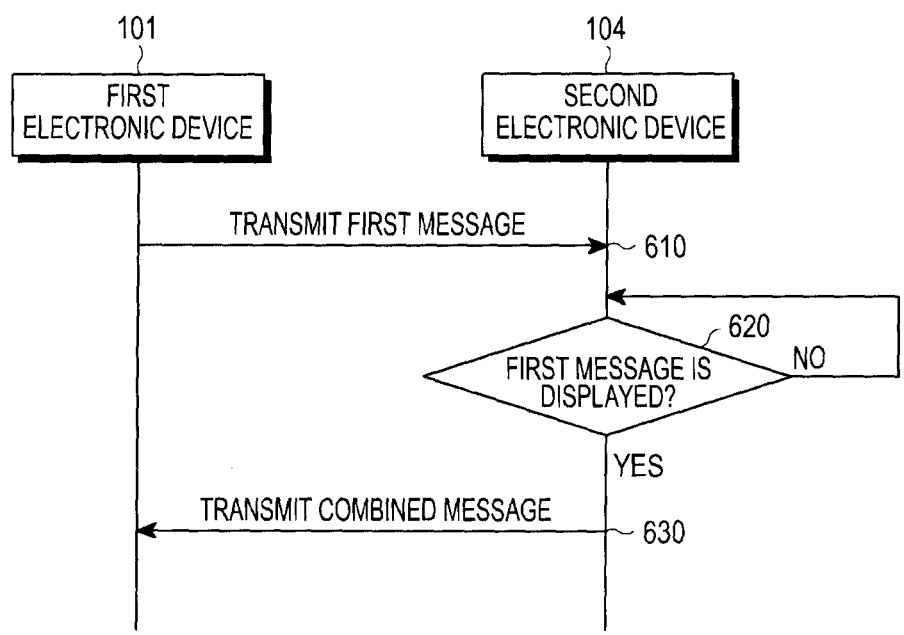
FIG. 6 is a flowchart illustrating a message transmission/reception method according to various embodiments of the present disclosure.

FIG. 6 is a flowchart illustrating a message transmission/reception method according to various embodiments of the present disclosure.

The first electronic device 101 may transmit a first message to the second electronic device 104 in operation 610.

The first electronic device 101 may transmit the first message to the second electronic device 104 via the server 400 (from FIG. 5). Meanwhile, according to another embodiment, the first electronic device 101 may directly transmit the first message to the second electronic device 104. For example, the first electronic device 101 may form a direct communication connection with the second electronic device 104 and, in this case, the first electronic device 101 may directly transmit the first message to the second electronic device 104 without relay of the server 400. The first electronic device 101 may form a communication connection with the second electronic device 104 based on various communication schemes such as Wi-Fi direct, Bluetooth, NFC, Zig-bee, Bluetooth Low Energy (BLE), and the like, and it is understood that this is not limited to direct or physical communication connection scheme between devices. Meanwhile, each of the server 400 and the second electronic device 104 may include a processing module and a transmission/reception module.

The first electronic device 101 may transmit, for example, a chatting message to the second electronic device 104 as the first message.

When the chatting message is received, the second electronic device 104 may generate a reception acknowledge message indicating that the chatting message is received by the second electronic device 104. Meanwhile, the second electronic device 104 may hold transmission of the reception acknowledge message.

The second electronic device 104 may monitor whether the first message is displayed in operation 620. The second electronic device 104 may determine whether an application that processes the first message is displayed in the foreground and determine whether a screen corresponding to the first message is displayed in the foreground of the corresponding application.

When it is determined that the first message is displayed, the second electronic device 104 may generate a display acknowledgement message indicating that the first message is displayed. The second electronic device 104 may combine the reception acknowledge message and the display acknowledge message to generate a combined message and transmit the combined message to the first electronic device 101 in operation 630.

The combined message may include data on the reception acknowledge message and data on the display acknowledge message.

Meanwhile, although it has been described that the second electronic device 104 generates the reception acknowledge message, and then generates the display acknowledge message, and then combines the two generated messages, it is understood that this is only an example embodiment and other implementations consistent with this disclosure are contemplated herein.

According to another embodiment, the second electronic device 104 may store the data on the reception acknowledge message without generating the reception acknowledge message according to the format. When the displaying of the first message is acknowledged in operation 620, the second electronic device 104 may generate the combined message by using the stored data on the reception acknowledge message and the data on the display acknowledge message and transmit the combined message.

According to another embodiment, when the displaying of the first message is acknowledged in operation 620, the second electronic device 104 may generate and transmit the combined message in a preset format. The combined message in the preset format may include the purpose of reception acknowledge and display acknowledge.

FIGS. 7A and 7B illustrate message formats according to an example useful for better illustrating the present disclosure.

As illustrated in FIGS. 7A and 7B, the electronic device according to the example may separately generate and transmit two messages 710 and 720. According to one example, the first message 710 may be a reception acknowledge message. As described above, the reception acknowledge message may include a time stamp, a URI of the receiving side electronic device, and a delivered status. The electronic device according to the example may generate the reception acknowledge message based on triggering of reception of a chatting message.

According to one example, the second message 720 may be a display acknowledge message. As illustrated in FIGS. 7A and 7B, the display acknowledge message may include a time stamp, a URI of the receiving side electronic device, and a displayed status. The electronic device according to the example may generate the display acknowledge message based on triggering of display of the chatting message in the foreground.

In the example of FIGS. 7A and 7B, the electronic device according to the example may transmit the first message 710 at, for example, 09:39:26.074 on 2013-07-22. Further, the electronic device according to the example may transmit the second message 720 at, for example, 09:39:26.074 on 2013-07-22.

FIG. 8 illustrates a format of a combined message according to various embodiments of the present disclosure.

As illustrated in FIG. 8, a combined message 800 may be described in one message format. The combined message 800 may include a time stamp, a URI of the receiving side electronic device, a delivered status 810, and a displayed status 820. According to an embodiment, the electronic device may acquire displaying of a chatting message in the foreground and generate the combined message 800 according to the chatting message. As illustrated in FIG. 8, the combined message 800 may include a time stamp of 09:39:26.074 on 2013-07-22 like the second message 720 according to the example of FIGS. 7A and 7B.

According to an embodiment, the electronic device may use a common part between the formats of the first message 710 and the second message 720 for the combined message 800. For example, the first message 710 and the second message 720 may include the URI of the same receiving side electronic device, and the electronic device may configure the URI of the receiving side electronic device of combined message 800 as the URI of the receiving side electronic device of the first message 710 and the second message 720.

According to an embodiment, the electronic device may generate the combined message 800 based on the displaying of the chatting message in the foreground. Accordingly, the combined message 800 may include the time stamp of 09:39:26.074 on 2013-07-22 like the second message 720.

According to an embodiment, the electronic device may generate the combined message 800 by describing the delivered status 810 and the displayed status 820 in a space for an input of the message type in the format of the first message 710.

Figure 9:
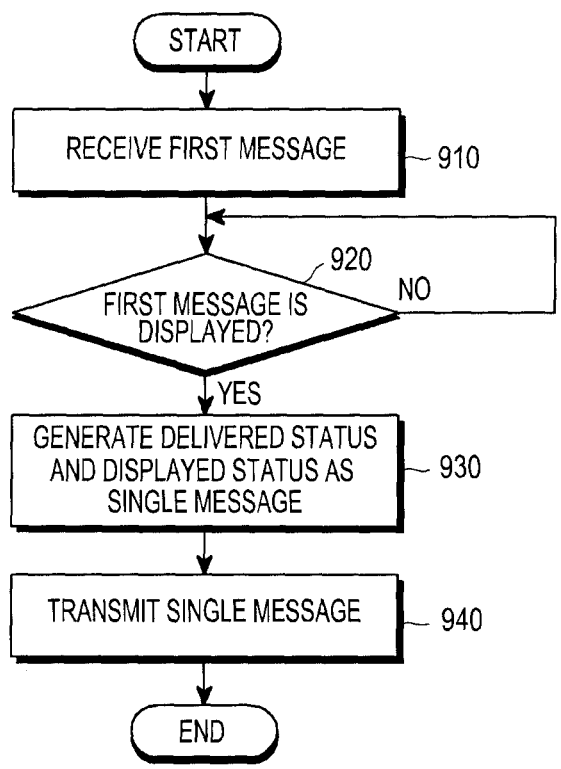
FIG. 9 is flowchart illustrating a message transmission/reception method of an electronic device according to various embodiments of the present disclosure.

FIG. 9 is flowchart illustrating a message transmission/reception method of an electronic device according to various embodiments of the present disclosure.

The electronic device may receive a first message in operation 910. According to an embodiment, the first message may be a chatting message.

The electronic device may determine whether the first message is displayed in the foreground in operation 920.

When it is determined that the first message is displayed in the foreground, the electronic device may generate a delivered status and a displayed status as a single message in operation 930. For example, the electronic device may generate the single message based on at least one format of a reception acknowledge message corresponding to the delivered status and a display acknowledge message corresponding to the displayed status. The single message may include a time stamp, a URI of the receiving side electronic device, and a delivered status, and a display status.

The electronic device may transmit the generated single message to the electronic device having transmitted the chatting message in operation 940.

Figure 10A:
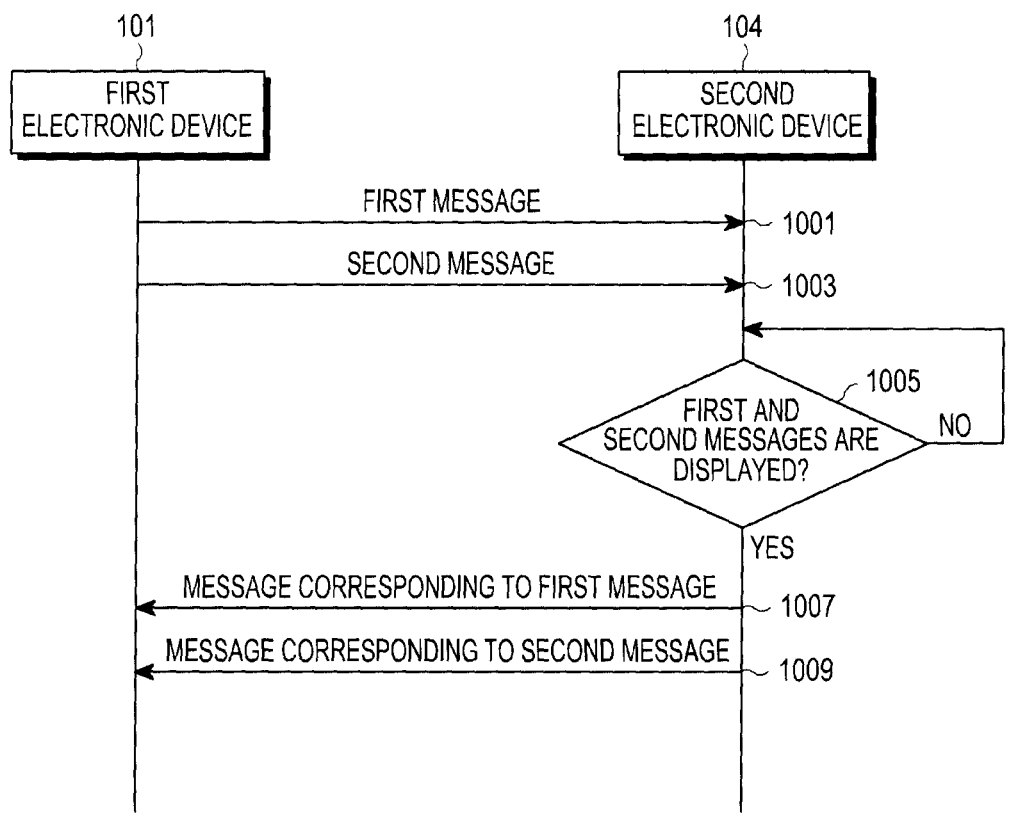
FIG. 10A is a flowchart illustrating a message transmission/reception method according to an example useful for better illustrating the present disclosure.

FIG. 10A is a flowchart illustrating a message transmission/reception method according to an example useful for better illustrating the present disclosure.

The first electronic device 101 may transmit a first message to the second electronic device 104 in operation 1001. The first electronic device 101 may transmit a second message to the second electronic device 104 in operation 1003. The first message and the second message may be chatting message transmitted at different times.

The electronic device may determine whether the first message and the second message are displayed in the foreground in operation 1005. For example, a chatting program executed in the electronic device may not be executed or may be executed in the background. Accordingly, the second electronic device 104 may not display the first message after the first message is received. Meanwhile, according to the message, it is assumed that the second message which is another chatting message is received by the second electronic device 104 in a state where the first message is not displayed.

Thereafter, the second electronic device 104 may display the chatting program in the foreground and, accordingly, display the received first message and second message in the foreground at the same time.

The second electronic device 104 may determine whether the first message and the second message are displayed in the foreground in operation 1005.

When the first message and the second message are displayed in the foreground, the second electronic device 104 may transmit a display acknowledge message corresponding to the first message to the first electronic device 101 in operation 1007.

The second electronic device 104 may transmit a display acknowledge message corresponding to the second message to the first electronic device 101 in operation 1009. That is, the second electronic device 104 according to the example may transmit the two display acknowledge messages to the first electronic device 101.

Figure 10B:
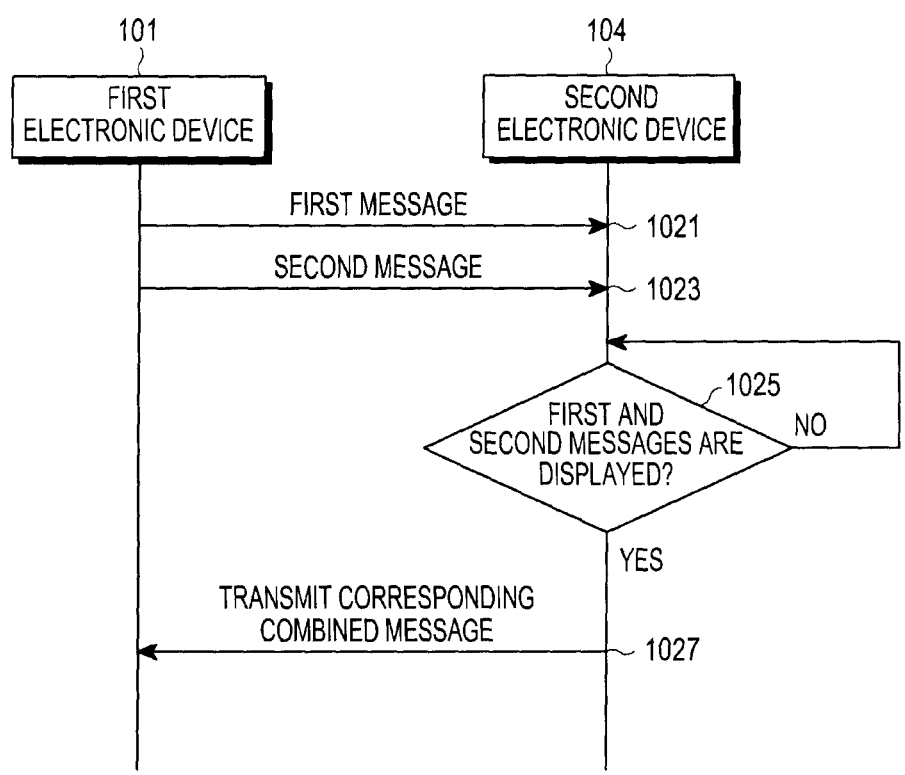
FIG. 10B is a flowchart illustrating a message transmission/reception method according to various embodiments of the present disclosure.

FIG. 10B is a flowchart illustrating a message transmission/reception method according to various embodiments of the present disclosure.

The first electronic device 101 may transmit a first message to the second electronic device 104 in operation 1021. The first electronic device 101 may transmit a second message to the second electronic device 104 in operation 1023. The first message and the second message may be chatting messages transmitted at different times.

The electronic device may determine whether the first message and the second message are displayed in the foreground in operation 1025. For example, a chatting program executed in the electronic device may not be executed or may be executed in the background. Accordingly, the second electronic device 104 may not display the first message after the first message is received. Meanwhile, according to the message, it is assumed that the second message which is another chatting message is received by the second electronic device 104 in a state where the first message is not displayed.

Thereafter, the second electronic device 104 may display the chatting program in the foreground and, accordingly, display the received first message and second message in the foreground at the same time.

The second electronic device 104 may determine whether the first message and the second message are displayed in the foreground in operation 1025.

When the first message and the second message are displayed in the foreground, the second electronic device 104 may transmit a combined message corresponding to the first message and the second message to the first electronic device 101 in operation 1027. The combined message may include the purpose of display acknowledge corresponding to the first message and the purpose of display acknowledge corresponding to the second message.

FIG. 11 illustrates a format of a display acknowledge message according to an example to be compared with the present disclosure.

As illustrated in FIG. 11, a display acknowledge message 1100 according to the example may include identifiers 1110 and 1120 and a displayed status 1130 of a chatting message. The display acknowledge message 1100 according to the example is described to include one chatting message identifier abc12345. For example, when the electronic device according to the example transmits three display acknowledge messages, the three display acknowledge message may be described to include different identifiers, respectively and transmitted.

FIG. 12 illustrates a format of a display acknowledge message according to various embodiments of the present disclosure;

As illustrated in FIG. 12, a display acknowledge message 1200 according to various embodiments of the present disclosure may include a plurality of chatting message identifiers 1210 and 1220. In the embodiment of FIG. 12, the display acknowledge message 1200 may include a first chatting message identifier abc12345 and a second chatting message identifier xyz7890. Further, the display acknowledge message 1200 may include a displayed status 1230. Accordingly, the display acknowledge message 1200 according to an embodiment of the present disclosure may include the purpose of display acknowledge of the two chatting messages.

Figure 13:
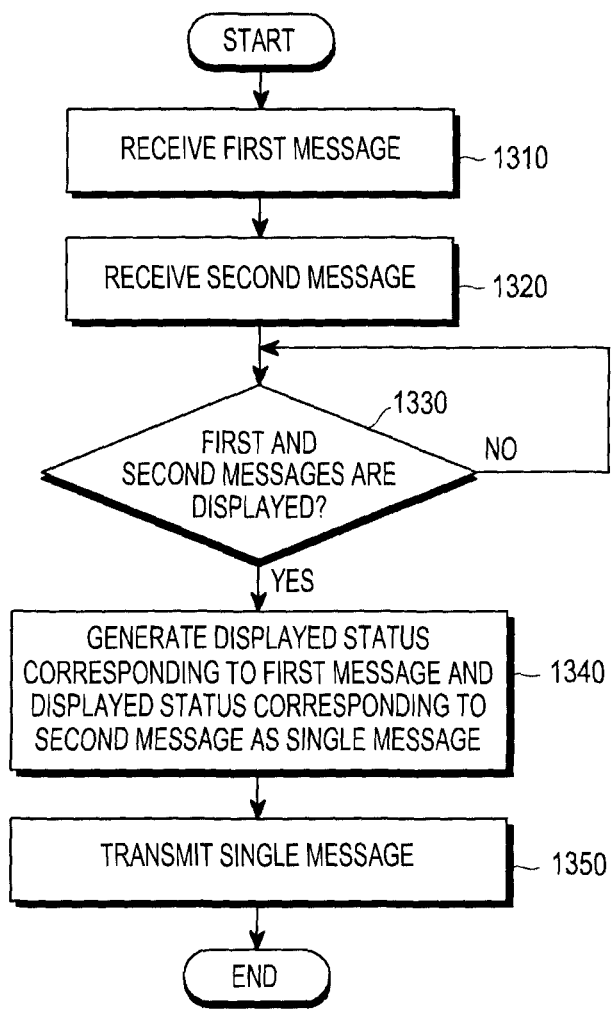
FIG. 13 is a flowchart illustrating a message transmission/reception method of an electronic device according to various embodiments of the present disclosure.

FIG. 13 is a flowchart illustrating a message transmission/reception method of an electronic device according to various embodiments of the present disclosure.

The electronic device may generate a first message in operation 1310. The electronic device may receive a second message in operation 1320. According to an embodiment, the first message and the second message may be chatting messages.

The electronic device may determine whether the first message and the second message are displayed in the foreground in operation 1330.

When it is determined that the first message and the second message are displayed in the foreground, the electronic device may generate a single message including a displayed status corresponding to the first message and a displayed status corresponding to the second message in operation 1340. According to an embodiment, the electronic device may generate the single message by writing the first message and a second identifier together in a space for an identifier input while describing the displayed statuses in common.

The electronic device may transmit the generated single message in operation 1350.

Figure 14A:
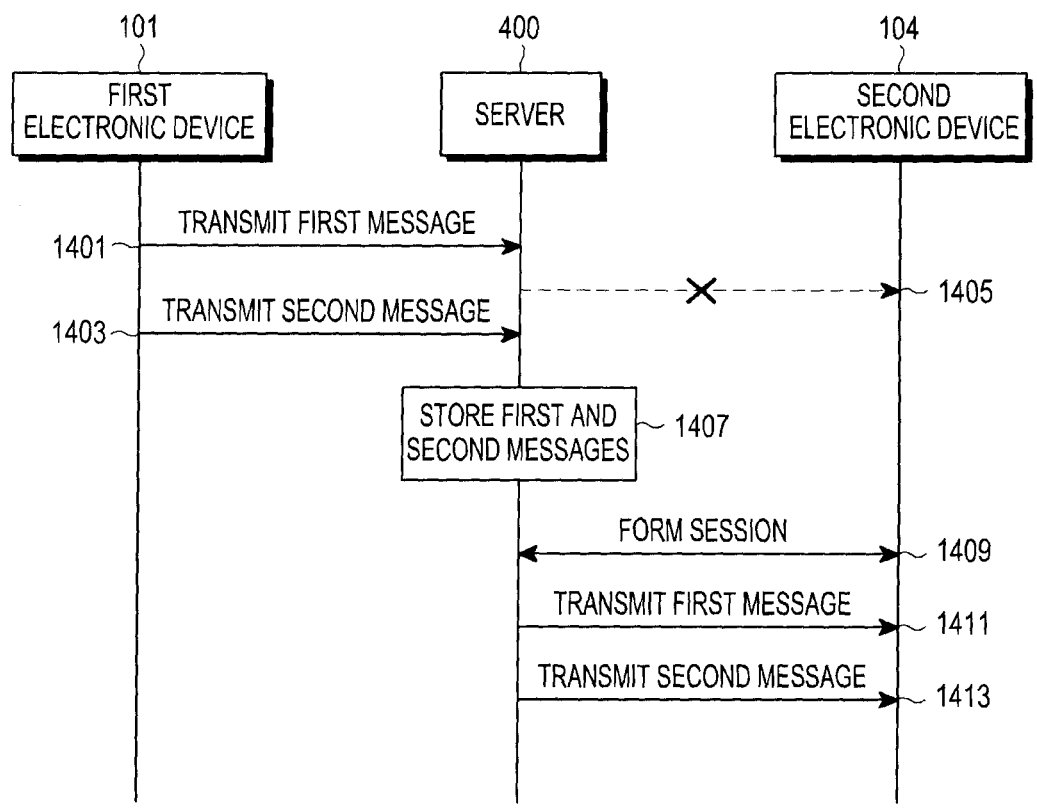
FIG. 14A is a flowchart illustrating a message transmission/reception method according to an example useful for better illustrating the present disclosure.

FIG. 14A is a flowchart illustrating a message transmission/reception method according to an example useful for better illustrating the present disclosure.

The first electronic device 101 may transmit a first message to the server 400 in operation 1401. The first electronic device 101 may transmit a second message to the server 400 in operation 1403. According to the example of FIG. 14A, it is assumed that a communication connection between the second electronic device 104 and the server 400 is released in operation 1405.

The server 400 may identify reception URIs of the first message and the second message received in operations 1401 and 1403. The server 400 may identify that the communication connection with the second electronic device 104 is released in operation 1405 and, accordingly, hold transmission of the first message and the second message and store the first message and the second message in operation 1407.

The second electronic device 104 may form a data session with the server 400 again in operation 1409. Since a process in which the second electronic device 104 and the server 400 form the data session based on the SIP has been described in detail, a further description thereof will be omitted herein.

The server 400 may transmit the stored first message to the second electronic device 104 in operation 1411. The server 400 may transmit the stored second message to the second electronic device 104 in operation 1413.

That is, the server 400 according to the example may separately transmit the stored first message and second message to the second electronic device 104.

Figure 14B:
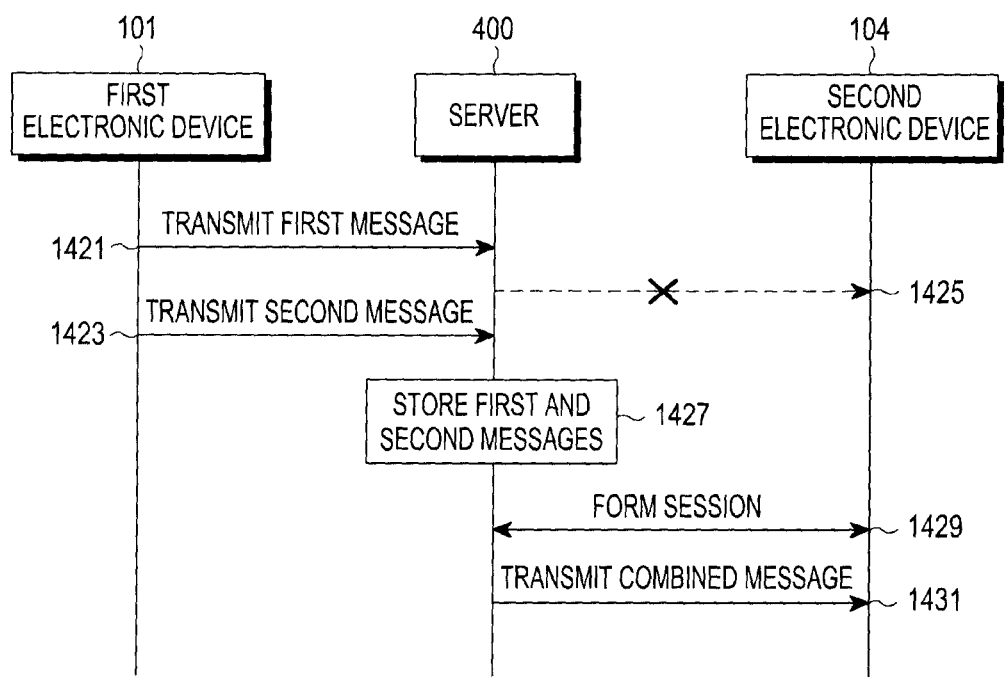
FIG. 14B is a flowchart illustrating a message transmission/reception method according to various embodiments of the present disclosure.

FIG. 14B is a flowchart illustrating a message transmission/reception method according to various embodiments of the present disclosure.

The first electronic device 101 may transmit a first message to the server 400 in operation 1421. The first electronic device 101 may transmit a second message to the server 400 in operation 1421. According to the embodiment of FIG. 14B, it is assumed that a communication connection between the second electronic device 104 and the server 400 is released in operation 1425.

The server 400 may identify reception URIs of the first message and the second message received in operations 1421 and 1423. The server 400 may identify that the communication connection with the second electronic device 104 is released in operation 1425 and, accordingly, hold transmission of the first message and the second message and store the first message and the second message in operation 1427.

The second electronic device 104 may form a data session with the server 400 again in operation 1429.

The server 400 may combine the first message and the second message to generate a combined message and transmit the combined message to the second electronic device 104 in operation 1431. The combined message may include message data on the first message and message data on the second message, and a more detailed format will be described with reference to FIG. 16.

FIG. 15 illustrates a format of a chatting message according to an example useful for better illustrating the present disclosure.

As illustrated in FIG. 15, a chatting message 1500 may include a message type 1510 and message data. According to the example, the message type 1510 is described as "cpim," which indicates a chatting message (for example, an IM message). Meanwhile, additionally, the chatting message 1500 may further include a message transmission URI, a message reception URI, a time stamp, a message identifier, a content type, and content size information.

FIG. 16 illustrates a format of a combined message according to various embodiments of the present disclosure.

As illustrated in FIG. 16, a combined message 1600 may include a first message 1630 and a second message 1640. The first message 1630 may include a message type, a message transmission URI, a message reception URI, a time stamp, a message identifier, a content type, content size information, and a message data (Hello). The second message 1640 may include a message type, a message transmission URI, a message reception URI, a time stamp, a message identifier, a content type, content size information, and a message data (Hello1).

The combined message 1600 may describe the first message 1630 and the second message 1640 to separate them by inserting boundaries 1620 and 1635. Meanwhile, the combined message 1600 may include combined message type 1610. According to an embodiment, the combined message 1600 may include combined message type 1610 of multipart/mixed; boundary=cpimboundary. This may indicate that a plurality of parts are mixed in the combined message 1600 and the plurality of parts are separated by the boundaries 1620 and 1635 of "cpimboundary".

Figure 17:
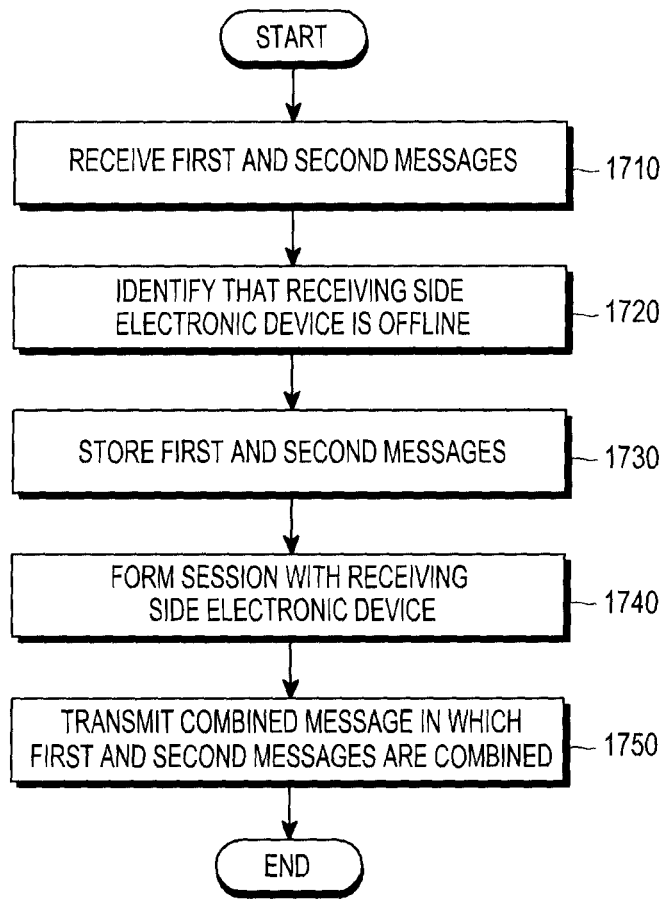
FIG. 17 is flowchart illustrating a message transmission/reception method of an electronic device according to various embodiments of the present disclosure.

FIG. 17 is flowchart illustrating a message transmission/reception method of an electronic device according to various embodiments of the present disclosure. The electronic device of FIG. 17 may be, for example, a server that relays message transmission/reception between a transmitting side electronic device and a receiving side electronic device.

The electronic device may receive first and second messages in operation 1710. The first and second messages may be chatting messages, for example, IM messages.

The electronic device may identify that a communication connection between the receiving side electronic device and the electronic device is released and, accordingly, identify that the receiving side electronic device is offline in operation 1720.

The electronic device may store the first and second messages in operation 1730. The electronic device may form the communication connection with the receiving side electronic device again and form a data session in operation 1740.

The electronic device may generate a combined message in which the first and second messages are combined and transmit the combined message to the receiving side electronic device in operation 1750.

FIGS. 18A, 18B, 19A and 19B illustrate concepts of screen configurations of a receiving side electronic device (e.g., electronic device 104 from FIG. 1) and a transmitting side electronic device (e.g., electronic device 101 from FIG. 1) according to various embodiments of the present disclosure.

The transmitting side electronic device 101 may transmit a first message including message data of "Hi" 1801 and a second message including message data of "James" 1802 to a server (not shown). The transmitting side electronic device 101 may display a screen configuration including a first message 1801 and a second message 1802.

Figures 18A, 18B:
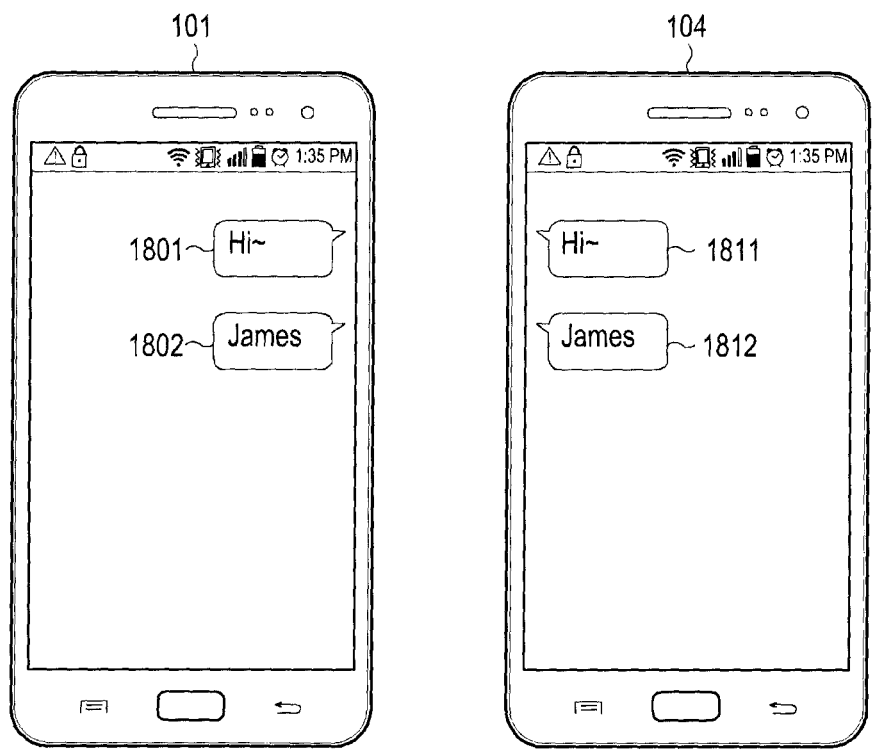
FIG. 18A, FIG. 18B, FIG. 19A and FIG. 19B illustrate concepts of screen configurations of a receiving side electronic device and a transmitting side electronic device according to various embodiments of the present disclosure.

Meanwhile, according to the embodiment of FIG. 18A, it is assumed that a communication connection between the server (not shown) and the receiving side electronic device 104 is released at a time point when the first message and the second message are received by the server (not shown). The server (not shown) may store the first message including message data of "Hi" and the second message including message data of "James" without transmitting the first message and the second message to the second electronic device 104.

Meanwhile, the server (not shown) may form the data session with the receiving side electronic device 104 again and transmit the combined message in which the first message and the second message are combined to the second electronic device 104 based on triggering of the data session.

The second electronic device 104 may display the received combined message. For example, the second electronic device 104 may parse and separate the first message and the second message based on a boundary included in the received combined message and display a screen configuration in which a first message 1811 and a second message 1812 are separated as illustrated in FIG. 18B.

Figure 19A:
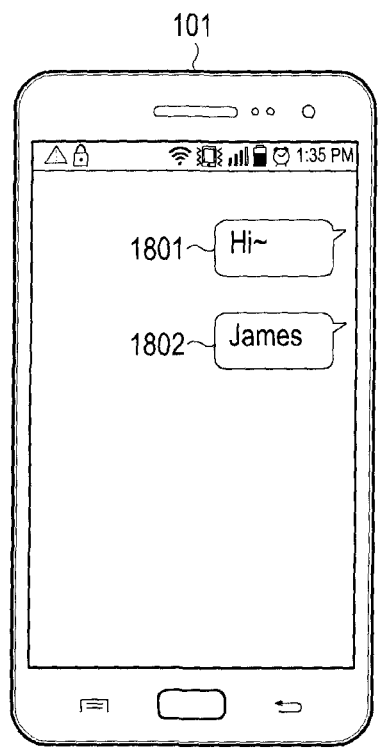
Figure 19B:
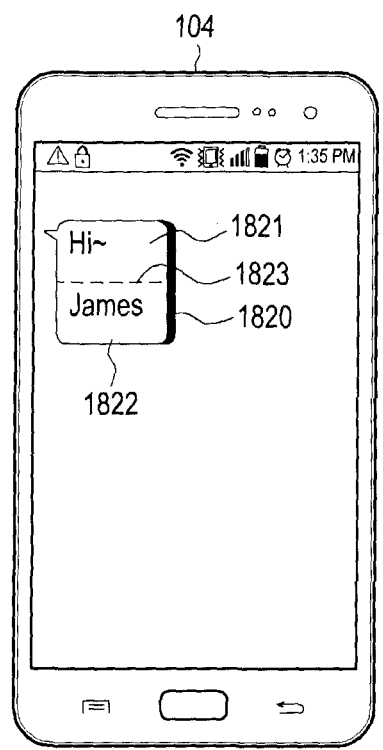

Meanwhile, according to another embodiment, after the same transmission as seen in FIG. 19A, the second electronic device 104 may display a first message 1821 and a second message 1822 together in one chatting box 1820 as illustrated in FIG. 19B. The second electronic device 104 may display a boundary 1823 between the first message 1821 and the second message 1822 in one chatting box 1820. It is understood that the disclosure here is only a single example of the embodiment, and the second electronic device 104 may in other embodiments display more or less visual indicators, such as not display the boundary 1823.

Figure 20:
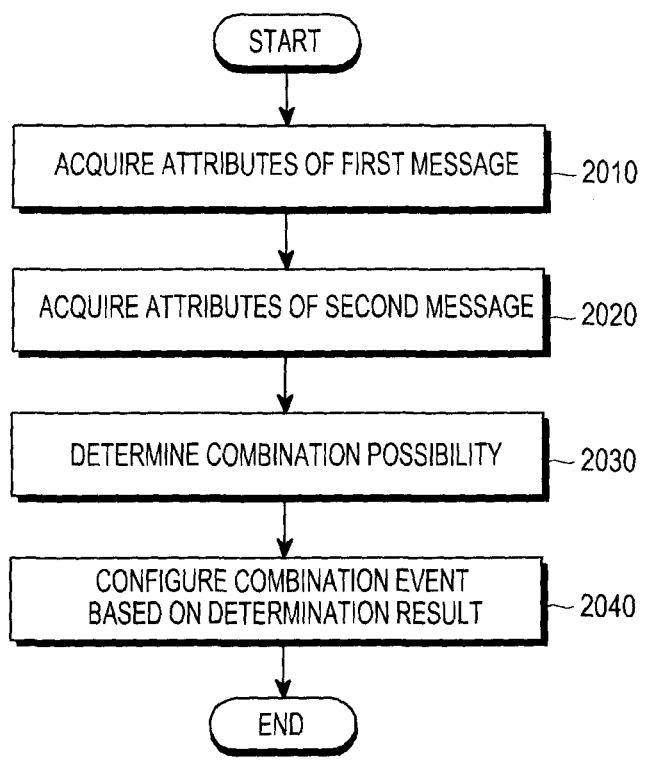
FIG. 20 is a flowchart illustrating a message transmission/reception method according to various embodiments of the present disclosure.

FIG. 20 is a flowchart illustrating a message transmission/reception method according to various embodiments of the present disclosure.

The electronic device may acquire attributes of a first message in operation 2010. The electronic device may acquire attributes of a second message in operation 2020. The electronic device may determine possibility of combination between the first message and the second message based on the acquired attributes of the first message and the acquired attributes of the second message in operation 2030.

For example, as illustrated in FIGS. 7A and 7B, the reception acknowledge message 710 and the display acknowledge message 720 may be described according to a format including message data which can describe the time stamp, the URI of the receiving side electronic device, the delivered status, and the displayed status. That is, the reception acknowledge message 710 and the display acknowledge message 720 may be described according to the same format.

According to an embodiment, the electronic device may identify formats of the reception acknowledge message 710 and the display acknowledge message 720 and determine combination possibility through the identification of the same format.

According to another embodiment, the electronic device may determine the combination possibility based on the same type of message as shown in the embodiments of FIG. 10B or 14B.

The electronic device may select a combination event based on a result of the determination of the combination possibility in operation 2040. For example, it may be determined that the combination is possible in that the reception acknowledge message 710 and the display acknowledge message 720 have the same format as illustrated in FIGS. 7A and 7B. The electronic device may configure generation of the reception acknowledge message 710 and generation of the display acknowledge message 720 as the combination event and, accordingly, hold transmission of the reception acknowledge message 710 even when a chatting message is received. Further, the electronic device may transmit the combined message when the chatting message is displayed.

Figure 21:
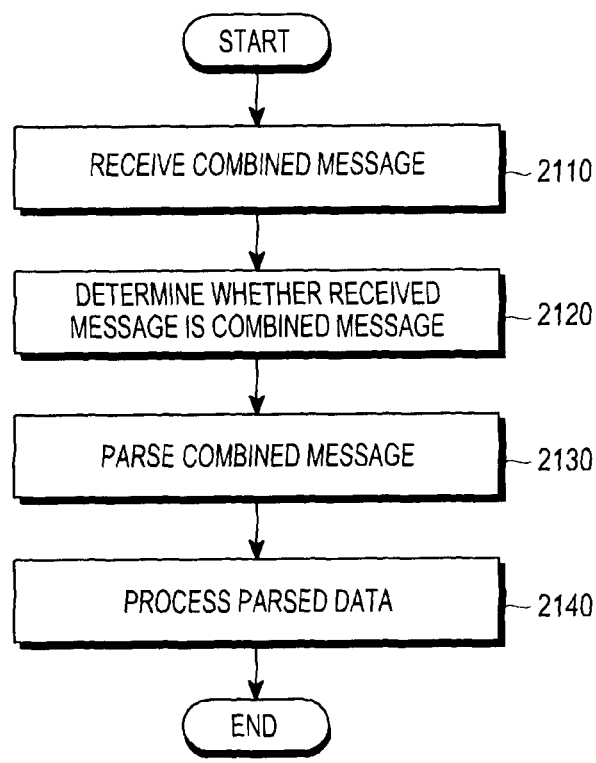
FIG. 21 is flowchart illustrating a message transmission/reception method of a receiving side electronic device according to various embodiments of the present disclosure.

FIG. 21 is flowchart illustrating a message transmission/reception method of a receiving side electronic device according to various embodiments of the present disclosure.

The receiving side electronic device may receive a combined message in operation 2110.

The receiving side electronic device may determine whether the received message is the combined message in operation 2120. According to an embodiment, the receiving side electronic device may describe two statuses, such as statuses 810 and 820 of message data as illustrated in FIG. 8. The receiving side electronic device may determine whether the combined message 800 is the combined message by identifying whether the combined message 800 of FIG. 8 includes the two statuses 810 and 820.

According to another embodiment, the receiving side electronic device may identify that a message 1200 includes a plurality of identifiers 1211 and 1212 as illustrated in FIG. 12. The receiving side electronic device may determine whether the combined message 1200 is the combined message by identifying whether the combined message 1200 of FIG. 12 includes the plurality of identifiers 1211 and 1212.

According to another embodiment, the receiving side electronic device may identify that the message type 1610 describes whether the message is the combined message as illustrated in FIG. 16. As described above in connection with FIG. 16, the combined message 1600 may include "multipart/mixed; boundary=cpimboundary" described in the message type 1610. Further, it may indicate that a plurality of parts of the combined message 1600 are mixed. The receiving side electronic device may determine whether the received message is the combined message by identifying the message type 1610 of the received message.

The receiving side electronic device may acquire data on each of a plurality of messages by parsing the combined message in operation 2130.

The receiving side electronic device may process the parsed data in operation 2140. For example, the receiving side electronic device may parse the combined message 800 of FIG. 8 into delivered status data and displayed status data and process the delivered status data to identify whether the chatting message is received by a counterpart electronic device and displayed on the counterpart electronic device.

According to another embodiment, the receiving side electronic device may parse the combined message 1200 of FIG. 12 into display data corresponding to a first chatting message and display data corresponding to a second chatting message. The receiving side electronic device may identify whether the first chatting message and the second chatting message are displayed on the counterpart electronic device by processing the two pieces of corresponding display data.

According to another embodiment, the receiving side electronic device may parse the combined message 1600 of FIG. 16 into first chatting message data and second chatting message data. The receiving side electronic device may display the first chatting message data and the second chatting message data by processing the two pieces of chatting message data.

According to various embodiments of the present disclosure, a method of transmitting/receiving a message by a first electronic device for transmitting/receiving a message to/from a second electronic device may include: acquiring a first message and a second message to be transmitted to the second electronic device; generating a combined message in which the first message and the second message are combined; and transmitting the combined message to the second electronic device.

According to various embodiments of the present disclosure, the first message may correspond to a reception acknowledge message corresponding to a chatting message received from the second electronic device and the second message may correspond to a display acknowledge message indicating that the received chatting message is displayed in the first electronic device.

According to various embodiments of the present disclosure, the method may further include: generating the reception acknowledge message; and holding transmission of the generated reception acknowledge message.

According to various embodiments of the present disclosure, the transmitting of the combined message may include transmitting the combined message when the received chatting message is displayed in the first electronic device.

According to various embodiments of the present disclosure, the generating of the combined message may include generating the combined message by describing a delivered status and a displayed status corresponding to the first message in a single message format based on formats of the first message and the second message.

According to various embodiments of the present disclosure, the first message may correspond to a first display acknowledge message corresponding to a first chatting message received from the second electronic device and the second message may correspond to a second display acknowledge message corresponding to a second chatting message received from the second electronic device.

According to various embodiments of the present disclosure, the transmitting of the combined message may include transmitting the combined message when the first chatting message and the second chatting message are displayed in the first electronic device.

According to various embodiments of the present disclosure, the generating of the combined message may include generating the combined message by describing a first delivered status corresponding to the first message and a second delivered status corresponding to the second message in a single message format based on a format of the first message.

According to various embodiments of the present disclosure, the generating of the combined message may include generating the combined message by describing an identifier of each of the first message and the second message in a single message format.

According to various embodiments of the present disclosure, the method may further include: when the first message is generated, determining whether a preset message combination event is acquired and, when the message combination event is acquired, holding transmission of the first message, generating the second message, and transmitting the combined message.

According to various embodiments of the present disclosure, a first electronic device for transmitting/receiving a message to/from a second electronic device may include: a processing module that acquires a first message and a second message to be transmitted to the second electronic device and generates a combined message in which the first message and the second message are combined; and a transmission/reception module that transmits the combined message to the second electronic device.

According to various embodiments of the present disclosure, the first message may correspond to a reception acknowledge message corresponding to a chatting message received from the second electronic device and the second message may correspond to a display acknowledge message indicating that the received chatting message is displayed in the first electronic device.

According to an embodiment, the processing module may generate the reception acknowledge message and hold transmission of the generated reception acknowledge message.

According to various embodiments of the present disclosure, the processing module may control the transmission/reception module to transmit the combined message when the received chatting message is displayed in the first electronic device.

According to various embodiments of the present disclosure, the processing module may generate the combined message by describing a delivered status and a displayed status corresponding to the first message in a single message format based on formats of the first message and the second message.

According to various embodiments of the present disclosure, the first message may correspond to a first display acknowledge message corresponding to a first chatting message received from the second electronic device and the second message may correspond to a second display acknowledge message corresponding to a second chatting message received from the second electronic device.

According to various embodiments of the present disclosure, the processing module may control the transmission/reception module to transmit the combined message when the first chatting message and the second chatting message are displayed in the first electronic device.

According to various embodiments of the present disclosure, the processing module may generate the combined message by describing a first delivered status corresponding to the first message and a second delivered status corresponding to the second message in a single message format based on a format of the first message.

According to various embodiments of the present disclosure, the processing module may generate the combined message by describing an identifier of each of the first message and the second message in a single message format.

According to various embodiments of the present disclosure, when the first message is generated, the processing module may determine whether a preset message combination event is acquired and, when the message combination event is acquired, hold transmission of the first message, generate the second message, and control the transmission/reception module to transmit the combined message.

According to various embodiments of the present disclosure, a method of transmitting/receiving a message by a server for relaying message transmission/reception between a second electronic device and a first electronic device may include: receiving a first message and a second message to be transmitted to the second electronic device from the first electronic device; when a message combination event for combining the first message and the second message is acquired, generating a combined message in which the first message and the second message are combined; and transmitting the combined message to the second electronic device.

According to various embodiments of the present disclosure, the message combination event may be generated in a state where a data session between the server and the second electronic device is not formed.

According to various embodiments of the present disclosure, the transmitting of the combined message to the second electronic device may include transmitting the combined message to the second electronic device when the data session between the server and the second electronic device is formed.

According to various embodiments of the present disclosure, the generating of the combined message may include generating the combined message by describing the first message and the second message in a single message format based on a format of the first message.

According to various embodiments of the present disclosure, the generating of the combined message may include describing the first message and the second message to be separated from each other in the single message format.

According to various embodiments of the present disclosure, a server for relaying message transmission/reception between a second electronic device and a first electronic device may include: a transmission/reception module that receives a first message and a second message to be transmitted to the second electronic device from the first electronic device; and a processing module that, when a message combination event for combining the first message and the second message is acquired, generates a combined message in which the first message and the second message are combined and transmits the combined message to the second electronic device.

According to various embodiments of the present disclosure, the message combination event may be generated in a state where a data session between the server and the second electronic device is not formed.

According to various embodiments of the present disclosure, the processing module may make a control to transmit the combined message to the second electronic device when the data session between the server and the second electronic device is formed.

According to various embodiments of the present disclosure, the processing module may generate the combined message by describing the first message and the second message in a single message format based on a format of the first message.

According to various embodiments of the present disclosure, the processing module may describe the first message and the second message to be separated from each other in the single message format.

According to various embodiments of the present disclosure, a method of transmitting/receiving a message by a second electronic device for transmitting/receiving a message to/from a first electronic device may include: receiving a combined message in which a first message and a second message to be transmitted to the second electronic device are combined; acquiring the first message and the second message by parsing the combined message; and processing the first message and the second message.

According to various embodiments of the present disclosure, a second electronic device for transmitting/receiving a message to/from a first electronic device may include: a transmission/reception module that receives a combined message in which a first message and a second message to be transmitted to the second electronic device are combined; and a processing module that acquires the first message and the second message by parsing the combined message and processes the first message and the second message.

Figure 22:
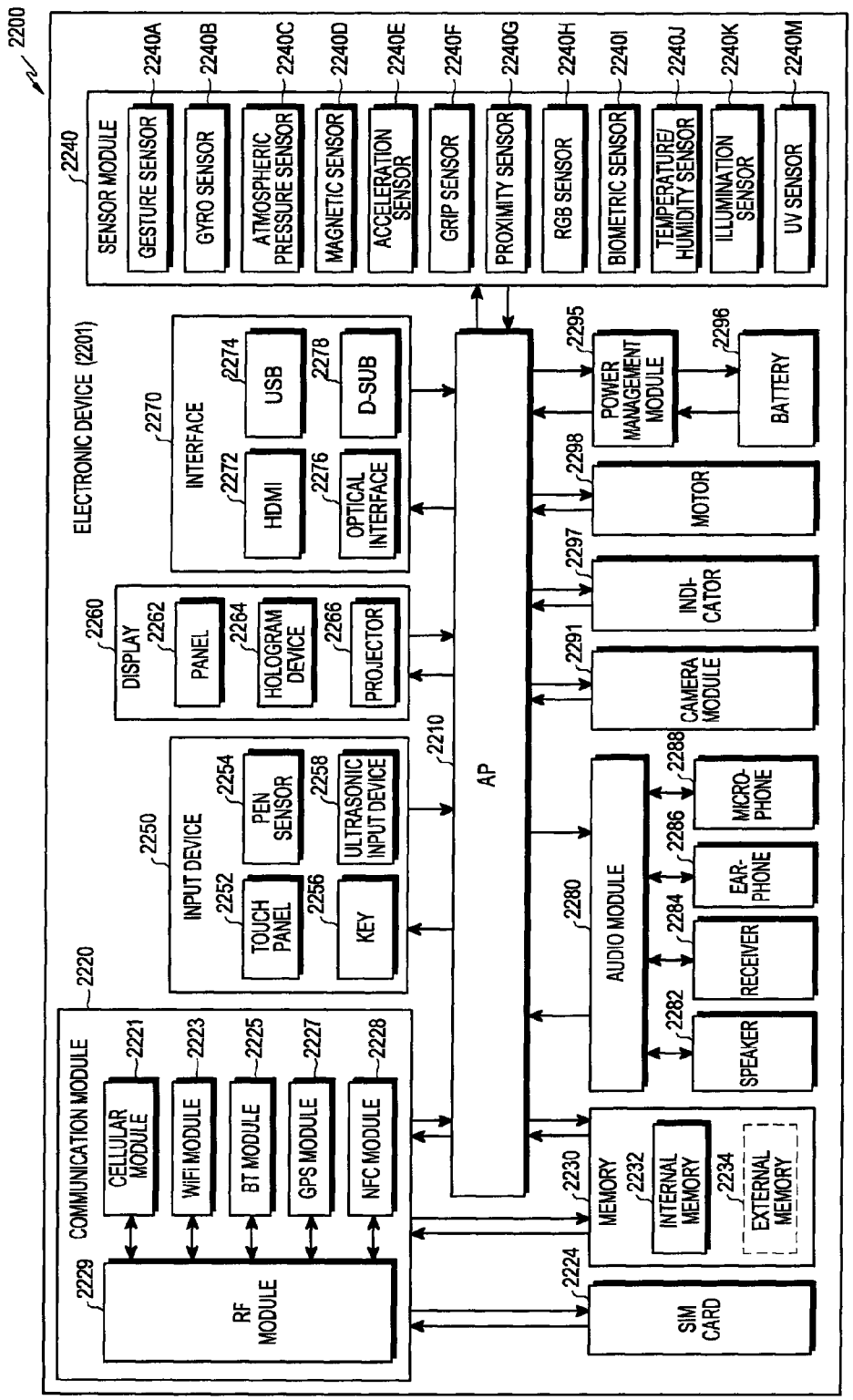
FIG. 22 is a block diagram of an electronic device according to various embodiments of the present disclosure.

FIG. 22 is a block diagram 2200 of an electronic device 2201 according to various embodiments of the present disclosure. FIG. 22 may be a block diagram particularly in a case where the electronic device 2201 is implemented by a terminal apparatus.

The electronic device 2201 may include, for example, all or some of the electronic device 101 illustrated in FIG. 1.

The electronic device 2201 may include at least one Application Processor (AP) 2210, a communication module 2220, a Subscriber Identification Module (SIM) card 2224, a memory 2230, a sensor module 2240, an input device 2250, a display 2260, an interface 2270, an audio module 2280, a camera module 2291, a power management module 2295, a battery 2296, an indicator 2297, and a motor 2298.

The AP 2210 may control a plurality of hardware or software components connected thereto by driving an operating system or an application program and may perform a variety of data processing and calculations. The AP 2210 may be embodied as, for example, a System on Chip (SoC). According to an embodiment of the present disclosure, the AP 2210 may further include a Graphical Processing Unit (GPU) and/or an image signal processor. The AP 2210 may include, for example, a cellular module. The AP 2210 may load instructions or data, received from at least one other component (for example, a non-volatile memory), in a volatile memory to process the loaded instructions or data, and may store various types of data in a non-volatile memory.

The communication module 2220 may have a configuration equal or similar to the communication interface 170 of FIG. 1. The communication module 2220 may include, for example, a cellular module 2221, a Wi-Fi module 2223, a BT module 2225, a GPS module 2227, an NFC module 2228, and a Radio Frequency (RF) module 2229.

The cellular module 2221 may provide a voice call, video call, text message services, or Internet services through, for example, a communication network. According to an embodiment, the cellular module 2221 may distinguish between and authenticate electronic devices 2201 within a communication network using a subscriber identification module (for example, the SIM card 2224). According to an embodiment of the present disclosure, the cellular module 2221 may perform at least some of the functions which may be provided by the AP 2210. According to an embodiment, the cellular module 2221 may include a Communication Processor (CP).

The Wi-Fi module 2223, the BT module 2225, the GPS module 2227, and the NFC module 2228 may include, for example, a processor for processing data transmitted/received through the corresponding module. According to any embodiment, at least some (two or more) of the cellular module 2221, the Wi-Fi module 2223, the BT module 2225, the GPS module 2227, and the NFC module 2228 may be included in one Integrated Chip (IC) or IC package.

The RF module 2229 may transmit/receive, for example, a communication signal (for example, an RF signal). The RF module 2229 may include, for example, a transceiver, a Power Amp Module (PAM), a frequency filter, a Low Noise Amplifier (LNA) or an antenna. According to another embodiment, at least one of the cellular module 2221, the Wi-Fi module 2223, the BT module 2225, the GPS module 2227, and the NFC module 2228 may transmit/receive an RF signal through a separate RF module.

The SIM card 2224 may include, for example, a card including a subscriber identification module and/or an embedded SIM, and may further include unique identification information (for example, an Integrated Circuit Card Identifier (ICCID)) or subscriber information (for example, International Mobile Subscriber Identity (IMSI)).

The memory 2230 (for example, the memory 130) may include, for example, an internal memory 2232 or an external memory 2234. The embedded memory 2232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 2234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 2234 may be functionally and/or physically connected to the electronic device 2201 through various interfaces.

The sensor module 2240 may measure, for example, a physical quantity or detect an operation state of the electronic device 2201, and may convert the measured or detected information to an electrical signal. The sensor module 2240 may include, for example, at least one of a gesture sensor 2240A, a gyro sensor 2240B, an atmospheric pressure sensor 2240C, a magnetic sensor 2240D, an acceleration sensor 2240E, a grip sensor 2240F, a proximity sensor 2240G, a color sensor 2240H (for example, red, green, and blue or "RGB" sensor), a biometric sensor 2240I, a temperature/humidity sensor 2240J, an illumination sensor 2240K, and an Ultra Violet (UV) sensor 2240M. Additionally or alternatively, the sensor module 2240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2240 may further include a control circuit for controlling at least one sensor included therein. In any embodiment, the electronic device 2201 may further include a processor configured to control the sensor module 2240 as a part of or separately from the AP 2210, and may control the sensor module 2240 while the AP 2210 is in a sleep state.

The input device 2250 may include, for example, a touch panel 2252, a (digital) pen sensor 2254, a key 2256, or an ultrasonic input device 2258. The touch panel 2252 may use at least one of, for example, a capacitive type, a resistive type, an infrared type, and an ultrasonic type. The touch panel 2252 may further include a control circuit. The touch panel 2252 may further include a tactile layer, and provide a tactile reaction to a user.

The (digital) pen sensor 2254 may include, for example, a recognition sheet which is a part of the touch panel or a separate recognition sheet. The key 2256 may include, for example, a physical button, an optical key or a keypad. The ultrasonic input device 2258 may detect an acoustic wave using a microphone (for example, the microphone 2288) of the electronic device 2201 through an input tool generating an ultrasonic signal to identify data.

The display 2260 (for example, the display 160) may include a panel 2262, a hologram device 2264 or a projector 2266. The panel 2262 may include a component equal or similar to the display 160 of FIG. 1. The panel 2262 may be embodied to be, for example, flexible, transparent, or wearable. The panel 2262 may also be configured to be integrated with the touch panel 2252 as a single module. The hologram device 2264 may show a stereoscopic image in the air by using interference of light. The projector 2266 may project light onto a screen to display an image. For example, the screen may be located inside or outside the electronic device 2201. According to an embodiment of the present disclosure, the display 2260 may further include a control circuit for controlling the panel 2262, the hologram device 2264, or the projector 2266.

The interface 2270 may include, for example, a High-Definition Multimedia Interface (HDMI) 2272, a Universal Serial Bus (USB) 2274, an optical interface 2276, or a D-subminiature (D-sub) 2278. The interface 2270 may be included in, for example, the communication interface 170. Additionally or alternatively, the interface 2270 may include, for example, a Mobile High-definition Link (MHL) interface, a Secure Digital (SD) card/Multi-Media Card (MMC) interface, or an Infrared Data Association (IrDA) standard interface.

The audio module 2280 may bilaterally convert, for example, a sound and an electrical signal. At least some components of the audio module 2280 may be included in, for example, the input/output interface 150 illustrated in FIG. 1. The audio module 2280 may process sound information input or output through, for example, a speaker 2282, a receiver 2284, earphones 2286, the microphone 2288, or the like.

The camera module 2291 is a device which may photograph a still image and a dynamic image. According to an embodiment, the camera module 2291 may include one or more image sensors (for example, a front sensor or a back sensor), a lens, an Image Signal Processor (ISP) or a flash (for example, LED or xenon lamp).

The power management module 2295 may manage, for example, power of the electronic device 2201. According to an embodiment, the power management module 2295 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge may measure, for example, the remaining amount of battery, a charging voltage and current, or temperature. The battery 2296 may include, for example, a rechargeable battery and/or a solar battery.

The indicator 2297 may show particular statuses of the electronic device 2201 or a part (for example, AP 2210) of the electronic device 2201, for example, a booting status, a message status, a charging status and the like. The motor 2298 may convert an electrical signal into mechanical vibrations, and may generate a vibration or haptic effect. Although not illustrated, the electronic device 2201 may include a processing unit (for example, GPU) for mobile TV support. The processing device for supporting mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. For example, the transmission/reception module is not pure software or software per say and constitutes hardware circuitry configured for operation.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory "CD-ROM" and a Digital Versatile Disc "DVD"), magneto-optical media (e.g., a floptical disk), a hardware device (e.g., a Read Only Memory "ROM", a Random Access Memory "RAM", a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium having commands stored therein is provided. The commands may be configured to allow one or more processors to perform one or more operations when being executed by the one or more processors. The one or more operations may include: acquiring a first message and a second message to be transmitted to the second electronic device; generating a combined message in which the first message and the second message are combined; and transmitting the combined message to the second electronic device.

Various embodiments disclosed herein are provided merely to easily describe technical details of the present disclosure and to help the understanding of the present disclosure, and are not intended to limit the present disclosure. Therefore, it should be construed that all modifications and changes or modified and changed forms based on the technical idea of the present disclosure fall within the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. A non-transitory computer-readable recording medium for storing instructions configured to perform one or more operations by a processor, the one or more operations comprising the processes of:
   receiving, by an electronic device, a text message from an external electronic device;
   generating a first information indicating that the text message is received;
   holding transmission of the first information to the external electronic device;
   determining, by the electronic device, whether the received text message is displayed on a display of the electronic device;
   in response to the determination, generating a second information indicating that the text message is displayed on the electronic device;
   generating, by the electronic device, a combined message including the first information and the second information; and
   transmitting, by the electronic device, the combined message to the external electronic device.

2. The non-transitory computer-readable recording medium of claim 1, wherein the first information includes a reception confirmation information for confirming the reception of the text message.

3. The non-transitory computer-readable recording medium of claim 1, wherein the second information includes a display confirmation information for confirming the reception of the text message.

4. The non-transitory computer-readable recording medium of claim 1, wherein the first information and the second information are generated according to a same format.

5. The non-transitory computer-readable recording medium of claim 1, wherein the combined message includes a time stamp, a uniform resource identifier (URI) of the external electronic device, a received status of the text message, and a display status of the text message.

6. The non-transitory computer-readable recording medium of claim 1, the processes further comprising:
   when the text message is not displayed on the display, postponing a generation of the combined message.

7. The non-transitory computer-readable recording medium of claim 1, wherein the generating of the combined message includes generating an identifier of each of a first message including the first information and a second message including the second information in a single message format.

8. An electronic device, comprising:
   a housing;
   a transceiver;
   a display disposed within the housing, and at least partially exposed through a portion of the housing; and
   a processor operatively coupled to the transceiver and the display, the processor configured to:
   receive, by the transceiver, a text message from an external electronic device,
   generate a first information indicating that the text message is received,
   hold transmission of the first information to the external electronic device,
   determine whether the received text message is displayed on the display of the electronic device, in response to the determination, generate a second information indicating that the text message is displayed on the electronic device,
   generate a combined message includes a first information and the second information and the second information, and
   transmit, by the transceiver, the combined message to the external electronic device.

9. The electronic device of claim 8, wherein the first information includes a reception confirmation information for confirming reception of the text message.

10. The electronic device of claim 8, wherein the second information includes a display confirmation information for confirming the reception of the text message.

11. The electronic device of claim 8, wherein the first information and the second information are generated according to a same format.

12. The electronic device of claim 8, wherein the combined message includes a time stamp, a uniform resource identifier (URI) of the external electronic device, a received status of the text message, and a display status of the text message.

13. The electronic device of claim 8, wherein the processor is further configured to:

when the text message is not displayed on the display, postpone generation of the combined message.

14. The electronic device of claim 8, wherein the processor is configured to generate an identifier of each of a first message including the first information and a second message including the second information in a single message format.

* * * * *